US005761529A

United States Patent [19]
Raji et al.

[11] Patent Number: 5,761,529
[45] Date of Patent: Jun. 2, 1998

[54] METHOD FOR STORING AND RETREIVING FILES BY GENERATING AN ARRAY HAVING PLURALITY OF SUB-ARRAYS EACH OF WHICH INCLUDE A DIGIT OF FILE IDENTIFICATION NUMBERS

[75] Inventors: Alexander David Raji, Atlanta; James Glen Allen, Suwanee; Scott Gregory Henion, Stone Mountain, all of Ga.

[73] Assignee: Lanier Worldwide Inc., Atlanta, Ga.

[21] Appl. No.: 771,257

[22] Filed: Dec. 20, 1996

Related U.S. Application Data

[62] Division of Ser. No. 324,903, Oct. 18, 1994.
[51] Int. Cl.⁶ .......................................................... G06F 17/30
[52] U.S. Cl. .......................... 395/824; 395/603; 707/3; 707/2; 707/100; 364/225.4; 364/283.1
[58] Field of Search .................................. 395/601, 824; 364/225.4, 283.1; 707/3, 2, 100

[56] References Cited

U.S. PATENT DOCUMENTS

| | | | |
|---|---|---|---|
| 3,623,158 | 11/1971 | Romsey | 711/200 |
| 3,648,248 | 3/1972 | Goldsberry | 345/156 |
| 3,916,387 | 10/1975 | Woodrum | 707/3 |
| 3,936,805 | 2/1976 | Bringol et al. | 395/873 |
| 3,965,484 | 6/1976 | Matz et al. | 360/61 |
| 4,255,796 | 3/1981 | Gabbe et al. | 707/3 |
| 4,303,998 | 12/1981 | Plunkett, Jr. | 369/29 |
| 4,371,752 | 2/1983 | Matthews et al. | 379/89 |
| 4,430,726 | 2/1984 | Kasday | 395/2.44 |
| 4,468,751 | 8/1984 | Plinkett, Jr. | 360/55 |
| 4,503,514 | 3/1985 | Urquhart | 707/533 |
| 4,760,526 | 7/1988 | Takeda et al. | 707/7 |
| 4,817,127 | 3/1989 | Chamberlin et al. | 379/67 |
| 4,827,462 | 5/1989 | Flannagan et al. | 369/32 |
| 4,999,787 | 3/1991 | McNally et al. | 395/283 |
| 5,053,948 | 10/1991 | DeClute et al. | 707/200 |
| 5,146,439 | 9/1992 | Jachmann et al. | 369/25 |
| 5,163,085 | 11/1992 | Sweet et al. | 379/89 |
| 5,218,696 | 6/1993 | Baird et al. | 707/1 |
| 5,263,159 | 11/1993 | Mitsui | 707/5 |
| 5,276,868 | 1/1994 | Poole | 707/3 |
| 5,303,361 | 4/1994 | Colwell et al. | 707/4 |
| 5,359,724 | 10/1994 | Earle | 707/205 |
| 5,404,455 | 4/1995 | Daly et al. | 395/824 |
| 5,457,782 | 10/1995 | Daly et al. | 395/2.09 |
| 5,497,485 | 3/1996 | Ferguson et al. | 707/1 |
| 5,519,808 | 5/1996 | Benton, Jr. et al. | 704/270 |
| 5,542,090 | 7/1996 | Henderson et al. | 707/2 |
| 5,553,284 | 9/1996 | Barbara et al. | 707/4 |
| 5,649,181 | 7/1997 | French et al. | 707/3 |

Primary Examiner—Thomas C. Lee
Assistant Examiner—Ki S. Kim
Attorney, Agent, or Firm—Jones & Askew, LLP

[57] ABSTRACT

A modular digital dictation system that can be easily modified to service a variable number of dictation stations and transcription stations. The modular digital dictation station comprises a central station for receiving digitized dictation signals from a network of dictation stations, storing the voice portion of the digitized dictation signals as digitized dictation segments, and routing the digitized dictation segments to a network of transcription stations. The central station includes a plurality of line interface and signal processing cards. The number of line interface and signal processing cards connected to the central station determines how many dictation stations and transcription stations the modular digital dictation station can service. The line interface cards may be removed from or connected to the central station during operations. A fast search program is provided to quickly find files containing desired digitized dictation segments stored in the central station. The fast search program uses arrays of identification numbers to quickly retrieve the files. The first array stores the address of the files in memory in the order in which the files are created. The second array stores identification numbers corresponding to each file in the order in which the files are created. The structure of the second array facilitates quickly finding an identification number. The position of the identification in the second array corresponds to a location in the first array containing the address in the file in memory. The position of the identification number in the second array is therefore used to calculate the location of the file in memory.

19 Claims, 13 Drawing Sheets

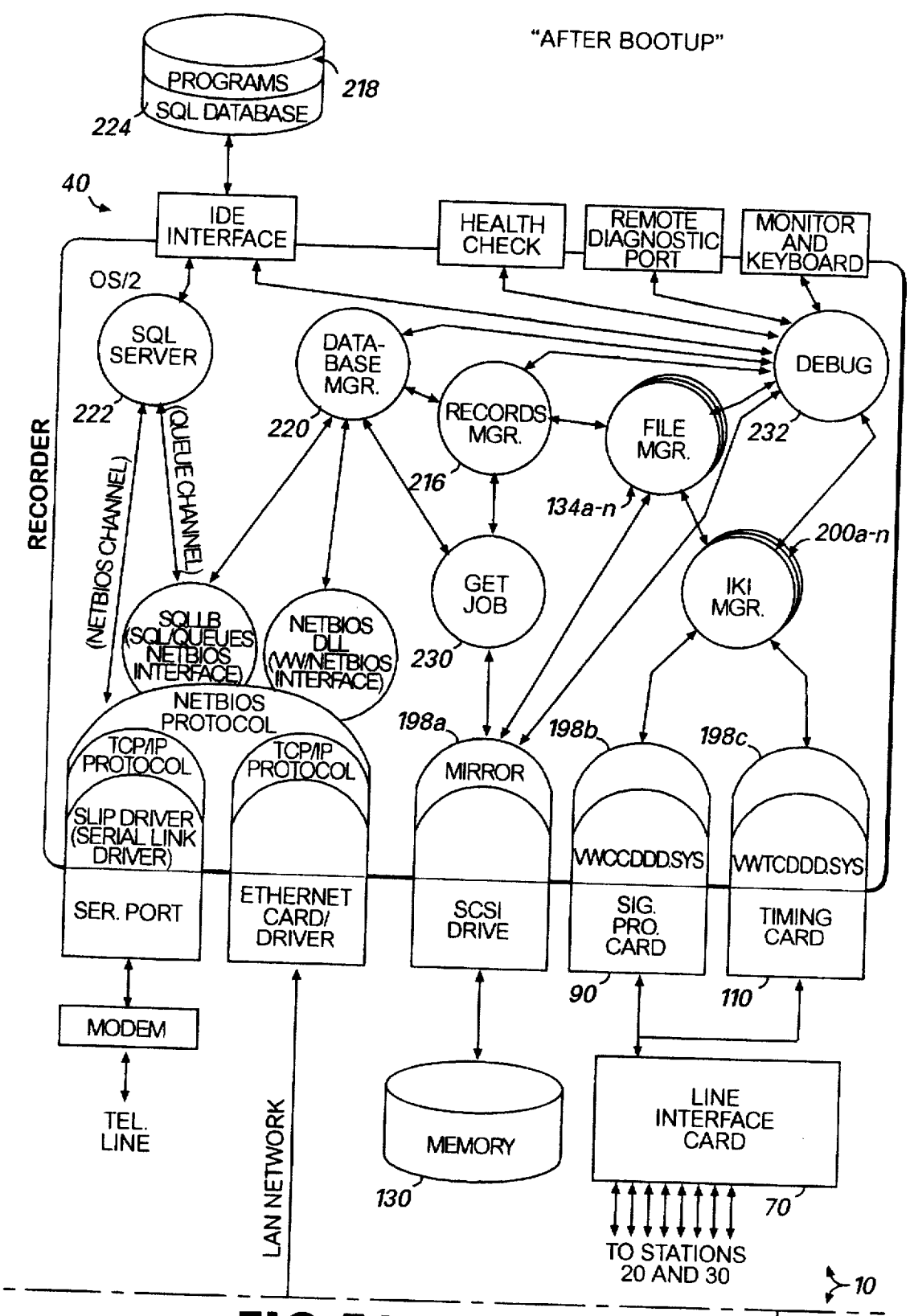
FIG. 5A  MATCH LINE TO FIG. 5B

METHOD FOR STORING AND RETREIVING FILES BY GENERATING AN ARRAY HAVING PLURALITY OF SUB-ARRAYS EACH OF WHICH INCLUDE A DIGIT OF FILE IDENTIFICATION NUMBERS

This is a divisional application under 37 C.F.R. §1.60, of prior application Ser. No. 08/324,903, filed Oct. 18, 1994, entitled "Modular Digital Dictation System," filed Oct. 18, 1994 on behalf of inventors Alexander D. Raji, James G. Allen and Scott G. Henion, and assigned to Lanier Worldwide, Inc.

TECHNICAL FIELD

The present invention relates to digital dictation systems, and more particularly is a modular digital dictation system wherein component cards can be added or removed from a central station to service variable numbers of dictation and transcription stations.

BACKGROUND OF THE INVENTION

Centralized dictation systems have been features of many American businesses and medical facilities for many years. Central dictation systems evolved in response to two basic needs of users of dictation and transcription equipment. The first need was for a system that could efficiently handle high volume, in terms of individual pieces of dictation, dictation/transcription loads where individual dictators may use the system only a relatively small portion of their working day. In other words, environments in which there were a large number of users, each of which required dictation equipment for a relatively small fraction of their working time is one that is ideally suited for a centralized system. This precludes the need for fixed locations for individual dictation recording units or the need to move from office to office to find an available dictation machine. Hospitals and other medical facilities are typical of such installations for central dictation equipment. A number of dictation stations which is substantially larger than the number of dictation recording media that are available can be connected and handled the traffic under all but the most unusual circumstances.

The transcription side corollary of this is that centralized dictation systems are ideally suited for circumstances in which there are pooled transcriptionists. Centralized systems provide relatively easy ways of switching output for transcription among various transcriptionists in a pool where there is little concern with matching a particular transcriptionist to the work of a particular dictator. Again, medical facilities, as well as insurance and military offices, are installations that typically employ such pools of transcriptionists.

A second need which central dictation systems meet, irrespective of whether there is transcription pooling or association of particular transcriptionists with particular dictators, is the avoidance of handling of individual recording media. Even businesses whose personnel are arranged so that same transcriptionists typically transcribe the work of particular originators adopt central dictation systems so that individual recording media will not have to be physically transferred with files under circumstances in which they can be misplaced, damaged, or transcribed out of order. The retention of a fixed recording media at the central dictation site precludes physical transfer of recording media for transcription.

In typical tape based central dictation systems of the prior art, a dictation transcription machine having a long endless loop of tape was provided. The tape was drawn by a recording station during dictation and deposited into a bin at which it awaited transcription via reproduction by a playback head on a transcription side, after which the tape was erased and deposited in a free tape bin. After this, it would return again to the dictation side for subsequent re-recording. Typical selection of a central recording unit by a dictator was accomplished through a key station selector mechanism or a multi-position switch, with audible ready tones being provided when an available central recording unit was selected.

On the transcribe side, selector switches or plug and cable patch panels were used to connect the outputs from transcription transducers from particular central recorders to transcription stations located at individual transcriptionists' desks.

In the 1970s and 1980s central dictation systems using individual cassettes as the recording media were developed. These systems were, in some sense, a hybrid of the features of previous fixed media central dictation units. Multiple cassette changers particularly designed for use in central dictation systems were provided. These could be selectively seized by various dictate stations in a manner essentially identical to that by which endless loop recorders were selected and seized. However, distribution of work for transcriptionists was accomplished by physical distribution of individual cassette recording media to transcriptionists having local transcription devices at their work stations. This allowed for more rapid selection of particular pieces of dictation for transcription from a given central dictation recorder at the expense of requiring physical handling of individual recording media, i.e., the cassettes. Additionally automated logging and assignment systems were developed to help control and supervise central systems employing cassette recorders.

Still more recently, digital central dictation systems have been developed. These are systems in which the recording media generally comprises a magnetic disk for storing digitized samples of recorded speech signals. On the dictation side analog to digital converters are employed to digitize the speech. Also, since speech tends to be redundant and of limited bandwidth, various compression schemes are used to reduce the amount of disk space required to store the digitized dictation. Maintaining a doubly linked list file structure for the individual pieces of dictation allows the transcription operation to move forward and backward through the samples during retrieval and reproduction (via digital to analog converters) on the transcription side. Additionally, the use of doubly linked lists allows material to be inserted within previously dictated material so that it is reproduced seemlessly when heard by the transcriber. Likewise, deletions of portions may be made without requiring the transcriber to wait for the passage of blank tape or long periods of silence.

While sophisticated central digital dictation systems represent the state of the art, there are some drawbacks to the basic architecture that has been employed in the prior art. In particular, most such systems have been designed so that a single media, at least from the perspective of system logic, is employed for recording of the digitized dictation. The number of channels that such a system can handle is normally fixed so that as the needs of a particular user of the equipment increase, a particular system may be out grown requiring discarding or resale of the system and the purchase of the next larger unit that will handle the user's increased requirements. The distance, in both system capacity and price, between adjacent units in any given suppliers line has tended to be relatively large, often increasing the number of available channels in the available storage space by a factor of two. The pricing of such size contiguous units tends to increase at approximately the same rate.

This has led to a situation in which the available technology has created a commercial environment in which a user that has out grown its dictation system is faced with trying to use a system with the inadequate capacity or purchase a significant excess of capacity. Common experience teaches that this leads to situations in which user dissatisfaction occurs during the period in which the user will struggle to get by with the existing system, and additional dissatisfaction at the practical requirement of purchasing an excess of capacity, much of which may not be needed for a considerable period of time, in order to alleviate that situation. It should be noted that prior art endless loop tape systems generally could be expanded gracefully in small increments by the addition of one or more central recording units. The only limitation normally encountered was exceeding the switching capacity of selection control equipment interconnecting the various central recorders with the dictate and transcribe stations. In the design of current state of the art digital dictation systems, system capacity has tended to increase in large increments due to the employment of central controllers for multiplexing and buffering the various dictate and transcribe stations. System capacity, with respect to the number of channels that may be simultaneously employed, has been dictated by the speed and processing power of the central controller as well as available memory for buffering and storage media capacity, i.e., disk space. Thus, the basic architecture of prior art digital central dictation systems has precluded a system that may be gracefully expanded or contracted in relatively small increments. In order to accommodate a wide variety of system capacities within a product line, a manufacturer would need to design, manufacture, and stock an excessive number of specific system designs leading to increased costs.

Thus, there is a need in the art for providing a central digital dictation system that may be gracefully expanded, in terms of channel and storage capacity, in relatively small units, without requiring substantial replacement of main components. The present invention is designed to address this need.

SUMMARY OF THE INVENTION

The present invention was conceived to provide a modular, centralized digital dictation system that can easily be modified to service a variable number of dictation and transcription stations. Generally described, the present invention comprises a central station for receiving digitized dictation signals from a network of dictation stations, storing the voice portion of the digitized dictation signals as digitized dictation segments, and routing the digitized dictation segments to a network of transcription stations. The capacity of the central station to service dictation and transcription stations may easily be expanded or reduced, as desired by the user.

More specifically described, the central station includes an AT computer connected to a large memory storage area that stores all the files of voice data generated at the dictation stations. In the preferred embodiment, the AT computer is embodied in a plug-in card on a mainframe rack and many software modules to track and monitor files containing the digitized dictation.

The central station further includes line interface cards that serve as input/output gateways between the AT card in the central station and the dictation and transcription stations. The central station also includes a plurality of signal processing cards. The signal processing cards process the digitized dictation signals, such as by compressing digitized voice for storage and expanding the digitized voice for transmission to the transcription stations. The signal processing cards also perform the handshaking necessary to pass digitized dictation signals between the line interface cards and the AT card. The line interface cards and signal processing cards are sometimes jointly referred to herein as component cards.

Both the line interface cards and the signal processing cards plug into a plurality of slots on a multiplexed bus in the central station. Alternatively, the line interface cards and signal processing cards can be remotely mounted in a rack and connected by cabling to connectors on the multiplexed bus in the central station.

A variable number of line interface and signal processing cards can operate in the central station. The addition of line interface and signal processing cards to the central station increases the number of digitized dictation stations and transcription stations that may be serviced. Therefore, a user can upgrade the capacity of a digital dictation system by simply installing more line interface cards and signal processing cards in the central station, rather than having to buy a new, more powerful system.

Furthermore, line interface cards can be installed while the modular digital dictation system of the present invention is operating. The line interface cards include extended power and ground pins that power up the circuitry on the card before the pins carrying signals into the line interface card are connected. The line interface card is thus powered up and ready to receive signals when the signals arrive at the line interface card. Therefore, the system need not be shut down to be upgraded with more line interface cards. Similarly, the system need not be shut down to replace faulty line interface cards.

Described in more detail, the digital dictation system comprises a network of dictation stations and transcription stations all connected to a central station. Digitized dictation segments are transmitted between the central station and each of the dictation stations and transcription stations. Line interface cards in the central station control the transfer of digitized dictation signals between the central station and the dictation and transcription stations. The line interface cards are the first stage of signal processing in the central station.

Inside the central station are two distinct data busses. The first bus connects each line interface card to a signal processing card for enabling the transfer of digitized dictation signals between the line processing cards and the signal processing cards. The first bus includes a time division multiplexed bus capable of carrying up to 128 voice and data channel pairs. Additionally, the first bus includes a communications control bus that facilitates control of the line interface and signal processing cards by the AT card.

In the preferred embodiment of the present invention, each individual line interface card and signal processing card can process up to eight channels of voice and data at one time. Each dictation station or transcription station utilizes one voice and data pair channel when operating. Therefore, one line interface card and one signal processing card can service up to eight dictation or transcription stations. The multiplexed bus (first bus) can carry up to 128 pairs of voice and data channels. The multiplexed bus can therefore service up to 128 dictation or transcription stations at one time.

For the central station to service more than eight voice/data channel pairs at one time, more than one line interface card and signal processing card must be provided. Because the multiplexed bus can carry up to 128 channels of voice and data, up to sixteen of the line interface cards and sixteen signal processing cards may be connected to the central station in the preferred embodiment of the present invention.

The number of line interface cards and signal processing cards in the system can be increased or decreased to appropriately service the number of digital dictation stations and transcription stations in a network. By connecting additional line interface cards and signal processing cards to the multiplexed bus in the central station, the system can be upgraded to service an increased number of stations. Therefore, according to one aspect of the present invention, a modular digital dictation system is provided.

The second bus connects the signal processing cards to a storage, processing and retrieval device that is controlled by the AT card. The second bus is a standard personal computer control and data communication bus as set forth in the ISA Bus standards promulgated by International Business Machines. Corp. for series AT personal computers.

Digitized dictation segments transmitted from a dictation station through a signal processing card are stored in a large hard disk drive in the central station. Software opens a file related to an identification number for each dictation session, wherein the identification number is obtained from the dictation station. The software stores the dictation in eight (8) kilobyte segments. Each file is labeled with headers and certain identifiers and stored in the hard disk drive. The software thus forms the digitized dictation segments into files and tracks the processing of the files, including the opening, closing and deletion of the files.

The files containing digitized dictation consist of a sixteen (16) kilobyte header and eight (8) kilobyte blocks of digitized dictation. The header consists of record file information and an index that is used to determine the order in which the blocks of digitized dictation are played back. The number of eight (8) kilobyte blocks varies depending on the length of the dictation session.

The software that tracks and monitors the files includes a record manager. The record manager software includes a table that contains the job number, record identification number, and status for each file stored in the hard disk drive. The table is built at system boot-up by reading the job record information of all files stored on the hard disk drive, and the table is maintained as files are created and completed.

When the dictation session first begins, a file manager software routine creates a file in the hard disk drive that will contain the digitized dictation, and tables in the records manager are updated to reflect the existence of the new file. The signals arriving at the AT card include digitized information signals, such as a header, and a digitized dictation segment containing digitized voice. Typically, the header identifies the dictator by a user identification number, and the header may also contain information regarding the subject and time of the dictation. For example, a doctor may type in his or her user identification number followed by a patient identification number.

The records manager may also be loaded with information corresponding to the patient, using the patient identification number. The information is looked up in memory tables accessible to the AT card. For example, one table might contain the patient history, including allergies, for each patient. The information obtained from the table(s) is added to the header of the corresponding file. When the file is ultimately transcribed, the information added to the header is added to the originally dictated information. Thus, a more complete file is created.

After the header information is obtained, the digitized dictation segments arrive at the AT card. The digitized dictation segments are placed in the file that is labeled by the header containing the doctor and the patient identification number.

According to another aspect of the preferred embodiment of the present invention, a method for quickly tracking and retrieving a stored file based on a file identification number, such as a job or user identification number, is provided. The centralized station may create thousands of files to store the digitized dictation segments generated by the dictation stations. These files consume large blocks of memory to store the digitized voice. The records manager must be able to rapidly find a particular file via, for example, a user identification number so that the file can be retrieved for review by the dictator or a transcriptionist. Therefore, a fast search program for storing and rapidly retrieving files containing digitized voice is implemented herein.

In the preferred embodiment of the fast search program, each file opened on the hard disk drive is assigned an identification number. Although the below discussion concerns a job identification number, it applies to a table constructed for fast access to user identification numbers or other identifiers for a large number of files. Each identification number is comprised of several digits. The identification number for the files are organized into a table forming a four-dimensional array of identification numbers.

Each digit from every identification number is loaded into a sub-array. For example, a first sub-array would contain the first digit of each identification number for a set number of jobs. The second sub-array would contain the second digit from each identification number for the set number of jobs, and so on. Thus, the first dimension in the array of identification numbers is the number of characters in the job number which equals the number of sub-arrays. For example, if the job identification number includes three characters, the number of sub-arrays is the first dimension and is equal to three.

The second dimension in the array of identification numbers is the possible values for a digit in the identification number. For example, in the preferred embodiment of the present invention, the identification number may be any number from 0–9 (because each identification number is encoded in ASCII), and so the second dimension would be ten. If each identification number was encoded in hexadecimal format, the second dimension would be sixteen.

Identification numbers are sequentially loaded in columns in the array as files are created. As is explained in detail below, the number of columns corresponds to the third dimension. The third dimension is limited by the width of the number of jobs that can be reviewed at one time. In the preferred embodiment, the third dimension is set to sixteen, but those skilled in the art will recognize that the third dimension could be up to thirty-two (32) bits wide in a computer that has a thirty-two bit mask. Typically, the third dimension corresponds to the number of bits used by the operating system in data operations.

The first, second and third dimensions are thus structured as follows. The first dimension is individual sub-arrays for each digit position in the job identification numbers. The second dimension is rows, with each row being one of the possible values of a digit in the identification number. The third dimension is the columns in the array, with each column containing an identification number. The second and third dimensions form the traditional "X" and "Y" coordinates to locate a position within each sub-array.

The above three dimensions form a complete listing of a set number of identification numbers, with the number of identification numbers contained in the array being limited by the third dimension. Another three dimensional array, identical to the three dimensional array set forth above, must be created to hold more jobs than the third dimension. The fourth dimension of the array thus identifies a particular three dimensional array among a plurality of three dimensional arrays.

For example, referring to FIG. 11 the four dimensional array 162 of identification numbers is set forth. The first dimension includes the sub-arrays 163a, b and c, which are demarcated by the leftmost column containing "0", "1" and "2". The second dimension is marked by the numbers "0-9" preceding the rows of numbers within each sub-array 163a-c. The third dimension is marked by the numbers "0-15" above the columns in the arrays 162a. The fourth dimension is another array 162b containing more job identification numbers. Additional arrays 162c-n (not shown) are created each time more than sixteen new jobs are created. Each time a file containing digitized voice is created, the identification number for the file is stored in the array. The first digit, second digit and third digit of the identification number are stored in the first, second and third sub-arrays, respectively. For example, referring to FIG. 11, the identification number "001" is stored in column one and each digit is marked by an "x". A second identification number is stored in column two, and so on.

When a file is to be retrieved, an identification number for the file is known, but the location of the file in memory is not. To find a file in memory, a sixteen-bit mask is created. The mask is sixteen bits set to "1". The mask is sequentially ANDed with the row of digits in the first, second and third sub-arrays that correspond to the first, second and third digits desired in the identification number. By consecutively ANDing a mask with the appropriate rows of digits in the sub-arrays that correspond to the digits in the identification number, all the identification numbers that might correspond to the desired identification number are located in the sub-arrays. Each array 162a-n is searched for the file. Thus, the desired file is located in the array 162.

As each file is created a job record number for the file is sequentially added to a table of files received. Therefore, the table of files received is simply a sequential list of the addresses of the files in memory. Each identification number is also loaded in the array concurrently with the creation of the file. Therefore, the identification number for a file in the array and the address for the file in the table of file received are related by their position in the respective arrays. The identification number in the array is cross-referenced to the job record for the file in the table of files received. The job record is used to find the file in memory.

In other words, the table of files received is built in conjunction with the creation of the array of identification numbers. The position of the identification number in the array is used to calculate the location of the corresponding file in the table of files received, which stores the address of the file in memory.

The location of identification numbers in the array can be matched to job records in the table before the files are created. Alternatively, the system may calculate the address in the host array for each identification number in real-time. The position in the array of the digits in the selected identification number is used in a formula that calculates the corresponding position in the table of files received.

Those skilled in the art will recognize that the above method presents a significant increase in the speed of finding files. The mask is sixteen bits wide, meaning that sixteen files are simultaneously checked by the ANDing step to determine if they include the identification digit of interest. Furthermore, files not containing the digits of interest are not even searched. Therefore, the fast search program provides a rapid method for finding files while limiting the memory space consumed.

Another preferred feature of the fast search program is "wild carding". In situations where a file is needed but the user does not know all the digits in the identifier number, a wild card search may be performed. In this search, all the files containing the known identification number digits are located. These files are all retrieved for the user's perusal. Thus, the unknown digits in the identification number are inconsequential to the search and are "wild cards".

Another computer is also connected to the AT computer. The second computer is called a console in the present invention. The console computer can access information concerning the files containing digitized dictation, including the headers. The user can thus access and monitor the files via the console. The user can sort the above referenced files according to any of the above-referenced identification numbers.

Accordingly, it is an object of the present invention to provide a module digital dictation system in which the number of dictation stations and transcription stations being serviced may be varied.

It is a further object of this invention to provide a modular digital dictation system in which the number of dictation stations and transcription stations being serviced can be increased or decreased while the digital dictation system operates.

It is a further object of this invention to provide a modular digital dictation system that stores files containing digitized dictation signals in a standardized format.

It is a further object of the present invention to provide a fast search program for quickly retrieving a file from among a plurality of stored files.

It is a further object of this invention to provide a fast search program wherein less than all digits in the identifier may be used to retrieve a number of files, thereby allowing a user to access a file without all the file identifier information.

Other objects, features, and advantages of the present invention will become apparent upon review of the following detailed description of embodiments of the invention, when taken in conjunction with the drawings and appended claims.

DETAILED DESCRIPTION OF DRAWINGS

This detailed description is divided under three sub-headings. The three sub-headings are: I. SYSTEM OVERVIEW, II. CONTROL STRUCTURE, and III. FLOW OF DIGITIZED DICTATION SIGNALS. The SYSTEM OVERVIEW describes the structure and function of the modular digital dictation system in general terms. The text under the sub-heading entitled CONTROL STRUCTURE sets forth the software and hardware operational controls of the modular digital dictation system. Finally, under the sub-heading FLOW OF DIGITIZED DICTATION SIGNALS, the flow of dictation signals through the hardware and software of the modular digital dictation system is detailed.

I. System Overview

Figure 1:
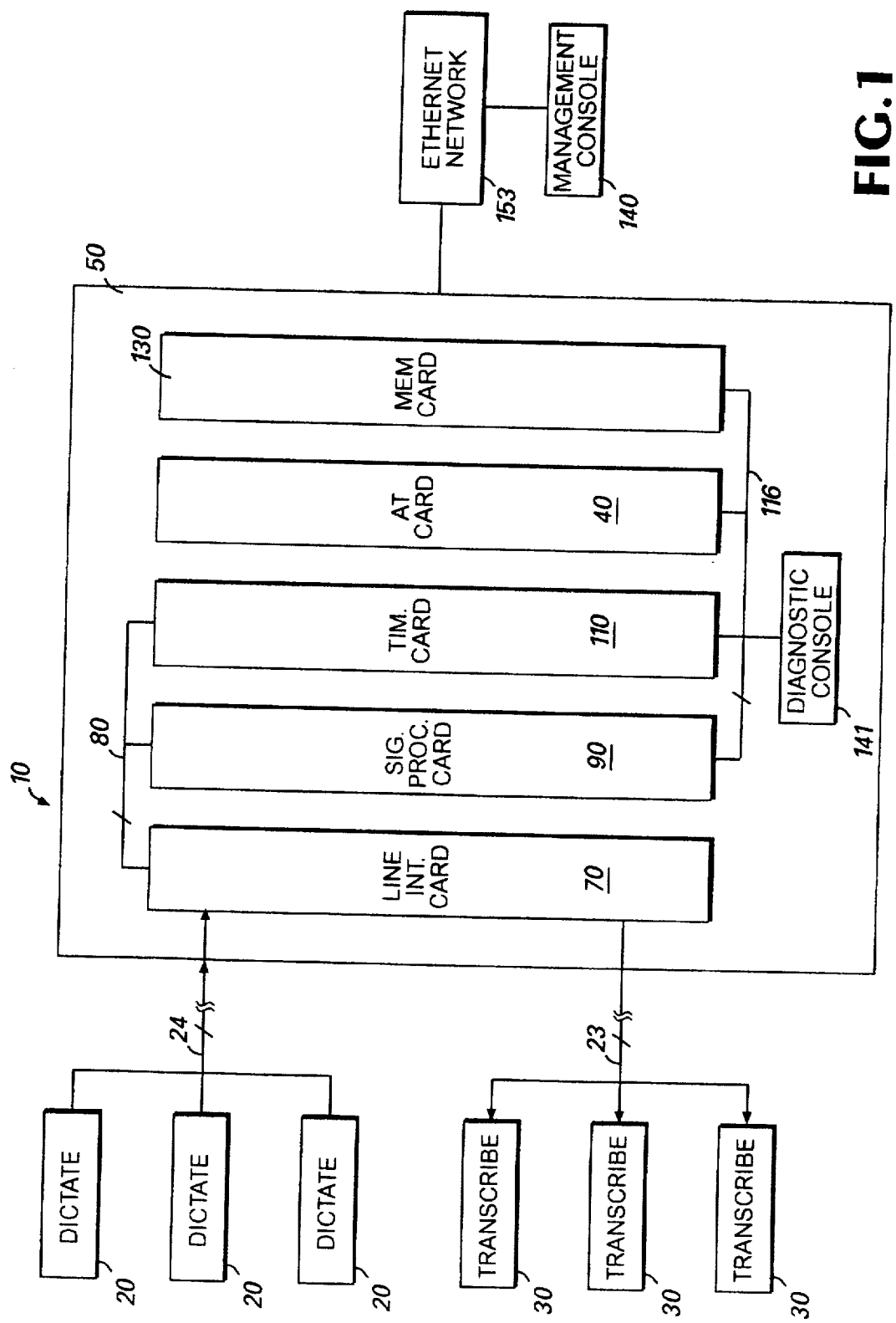
FIG. 1 is a block diagram of the preferred embodiment of the present invention.

Turning now to the drawings, in which like numerals represent like components throughout the several figures, FIG. 1 is a block diagram of the preferred embodiment of the present invention, a modular digital dictation system 10. The modular digital dictation system 10 comprises a plurality of digital dictation stations 20 and a plurality of transcription stations 30 connected to a central record and controller station 50.

Referring to FIG. 1, the modular digital dictation system 10 of the present invention performs the following tasks. Analog audio voice is modulated into digitized dictation signals at dictation stations 20. The digitized dictation signals are passed to central station 50. The digitized dictation signals are organized into files by software running on the AT card 40. The digitized dictation signals are processed and stored in files in memory 130. As desired, the files containing the digitized dictation signals are retrieved and passed to transcription stations by the central station 50. At the transcription stations 30, the digitized dictation signals are formed into analog audio signals and transcribed.

The preferred modular digital dictation system 10 is representative of the type used in a central dictation system having transcribe stations 30 and dictation stations 20 connected to one or more centrally located stations or recorders via extensive conduit wiring 24 distributed throughout the physical plant of a business. During dictation operations, a dictation station 20 generates a sequence of digitized dictation signals, including a dictation segment containing the dictated work and a digitized identification signal containing information corresponding to the dictation segment. The digitized identification signal typically includes descriptive information, also referred to as header data, directed to the origination and the subject of the dictated work. In response to the digitized dictation signals carried by wiring 24, the central record and controller station 50 operates upon the dictation signals to store the dictation segment and header pending transcription at one of transcription stations 30. The transcription stations 30 are connected to the central station via wiring 23.

Figure 2:
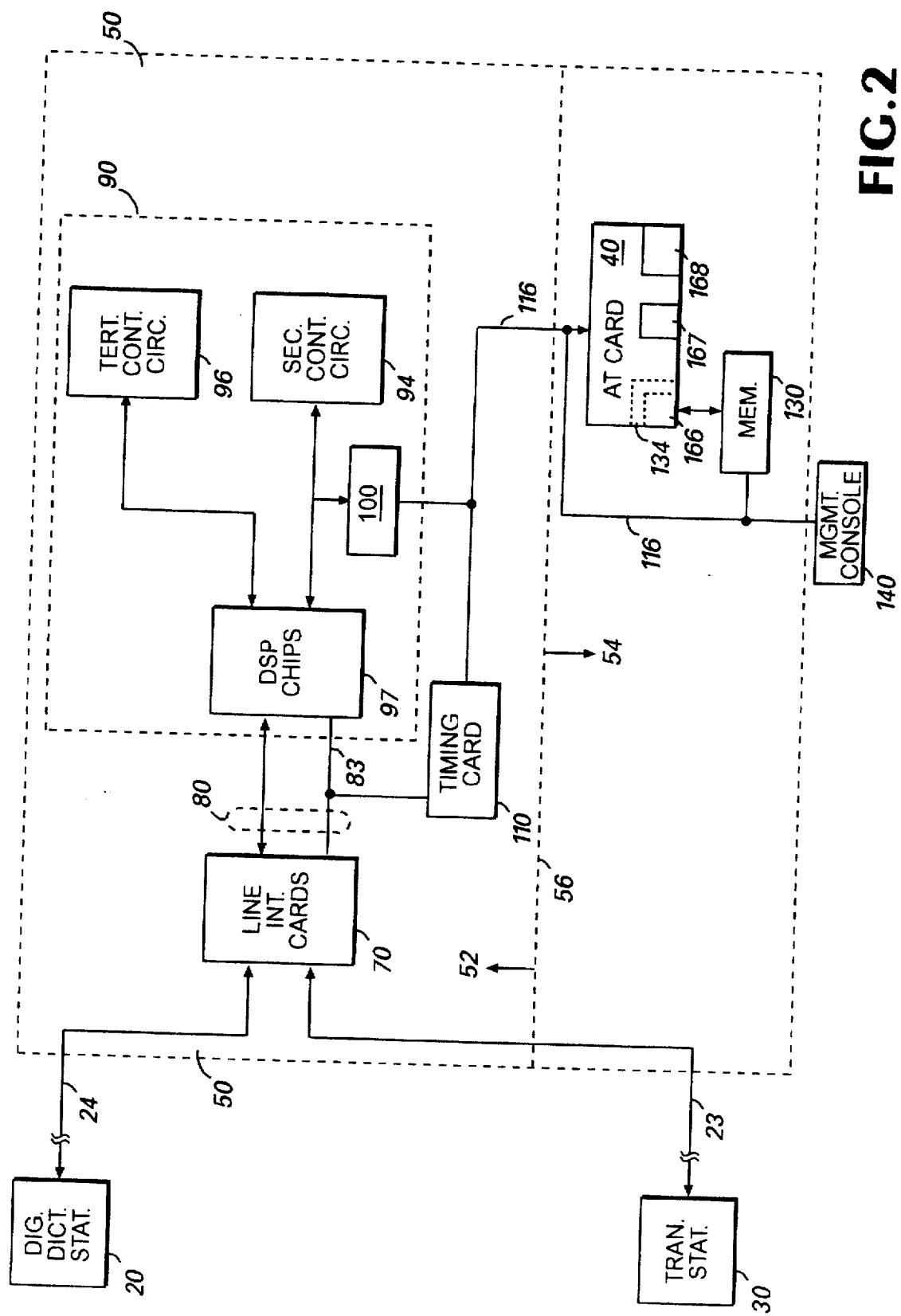
FIG. 2 is a block diagram showing the flow of digitized dictation signals in the present invention.

Referring now to FIG. 2, a block diagram showing the general flow of digitized dictation signals in the central station 50 is disclosed. Implementation of the preferred embodiment of the modular digital dictation system 10 includes many component cards, identified as line interface cards 70 and signal processing cards 90, but for simplicity only one of each is shown in FIG. 2.

As is shown in FIG. 2, the central station 50 can be logically divided into two sections, indicated by reference numerals 52 and 54. First, a timing card 110, line interface cards 70 and signal processing cards 90 may be considered as one distinct section 52 of the central station 50, shown above the dotted line 56. The components in section 52 are primarily hardware. Second, the AT card 40, memory 130 and management console 140 may be logically considered as a second section 54, shown below the dotted line 56. The primary functions performed in section 54 are software controlled. The distinction between the two sections, 52 and 54, is also based on the control structure in each section and the data and control busses utilized in each section. The distinction is simply a tool to help understand the operation of the modular digital dictation system 10.

Digitized dictation signals are communicated between line interface cards 70 and signal processing cards 90 via time division multiplexed bus 80 (FIG. 2). As will be more fully explained below, the multiplexed bus 80 carries many channels of digitized voice and data as well as control signals. The signal processing cards 90 process and temporarily store the digitized dictation signals received on multiplexed bus 80 in dynamic random access memory (DRAM) 100.

After being processed in section 52, the digitized dictation signals are transferred from the DRAM 100 in section 52 to the AT card 40 in section 54 via an ISA bus 116. The ISA bus 116 is a standard bus used in International Business Machines Corp. computers. Those skilled in the art will recognize that other busses, including but not limited to standard personal computer busses, may be utilized. For example, an Extended ISA bus, known as an EISA bus, may be used to construct embodiments of the present invention.

The AT card 40 is the motherboard for an IBM Corp. compatible computer, familiar to those skilled in the art. Other controllers can be used in place of AT card 40, as will be familiar to those skilled in the art.

The operation of the software in the AT card 40 is described in detail below. Very generally described, the digitized dictation signals transferred to the AT card 40, are organized into files by a program running on the AT card 40 and stored in memory 130. Operation of the software on the AT card 40 is detailed below.

When needed for transcription, or if a dictator wishes to review recorded dictation, the file containing digitized dictation segments is retrieved from memory 130 by AT card 40 (FIG. 1). For example, the file containing the dictation segments to be transcribed is passed along the same path that was used to bring it to the AT card 40. Specifically, the dictation segment is transferred from memory 130 to a signal processing card 90 via ISA bus 116, and then to a line interface card 70 on multiplexed bus 80 on the way to a transcription station 30.

In the preferred embodiment, dictation segments transmitted from the central station 50 are passed through another CODEC (not shown) at the transcription stations 30 (FIG. 2). The CODECs convert the digitized dictation segments from μ-law pulse code modulation (PCM) format into audio signals. The transcriptionist can then transcribe the voice. The communication path between the transcription stations 30 and the central station 50 on wiring 23 is analogous to the communication along wiring 24 between the digital dictation station 20 and the central station 50.

One of the important features of the present invention is the modularity of the system. The provision of two distinct busses, 80 and 116, in the central station 50 allows for the modularity of the digital dictation system 10 (FIG. 2). The multiplexed bus 80 can carry up to 128 voice and data channel pairs in the preferred embodiment of the present invention. To vary the number of dictation stations 20 or transcription stations 30 that can be serviced by the modular dictation system 10, the number of line interface cards 70 and signal processing cards 90 that are connected to multiplexed bus 80 is varied. The addition of line interface cards 70 and signal processing cards 90 increases the number of dictation stations 20 and transcription stations 30 that are serviced by the central station 50. This modularity allows the preferred modular digital dictation system 10 to be expanded as desired by the user up to a maximum of 128 voice and data channels in increments of a few channels at a time, eight in the preferred embodiment.

The use of the standard AT bus 116 to receive and store files allows the files to be readily communicated to other standard computers and networks. For example, a manager of the central station 50 might want to move files containing digitized dictation signals from a company's San Diego office to their Atlanta office, because there are more people in Atlanta available to do transcription. The manager could access files from memory 130 via an ETHERNET network 153 (FIG. 1), and transfer the files to Atlanta via a modem or a wide area networking system (not shown). The interface between AT card 40 and other computers and/or networks for transferring files to and from memory 130 is well-known to those skilled in the art. Thus, use of the AT ISA bus 116 allows for standardized treatment and communication of files that contain digitized dictation signals.

Figure 3:
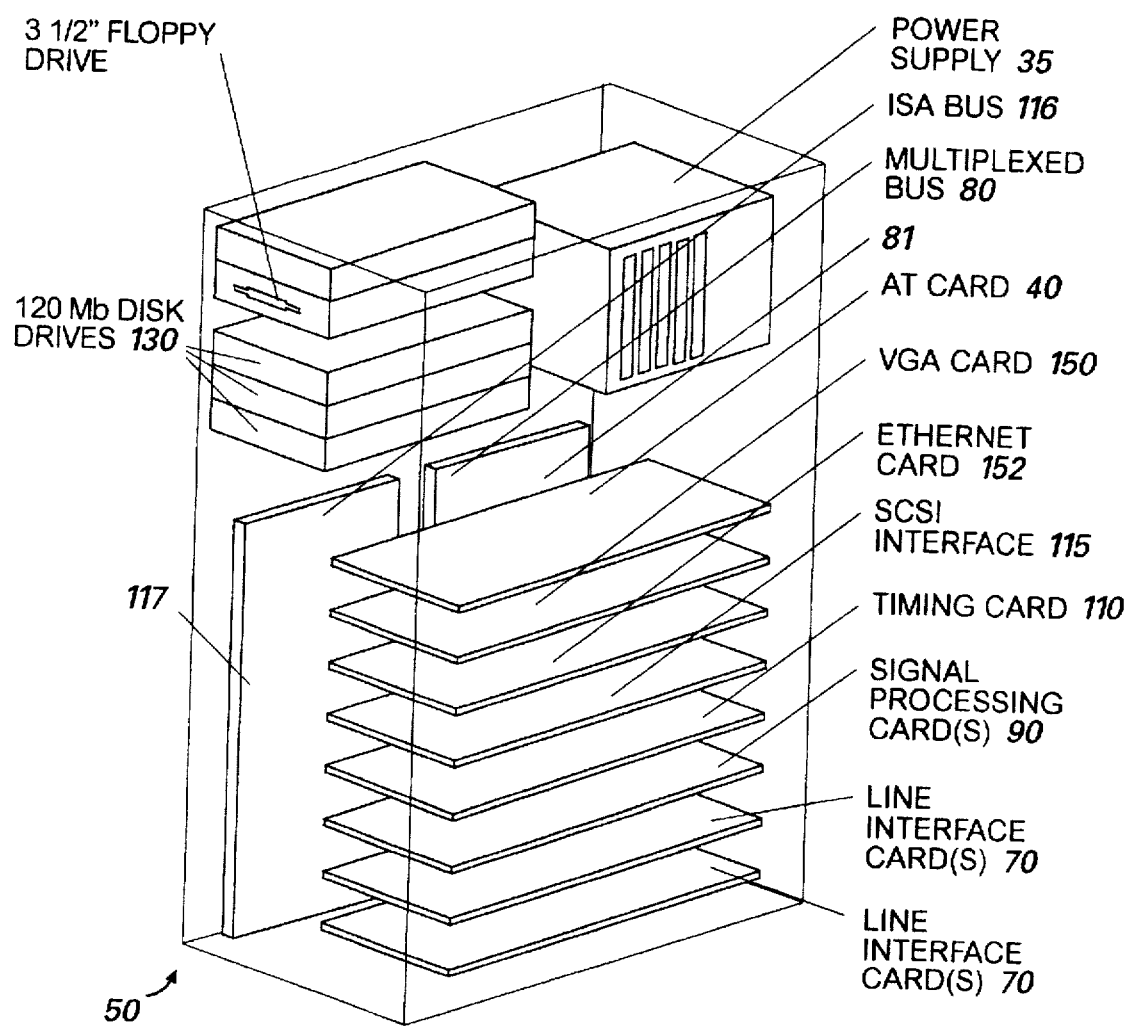
FIG. 3 is a front perspective view of the central station in the preferred embodiment of the present invention.

Turning now to FIG. 3, a front perspective view of the central station 50 is shown. In the preferred embodiment of the present invention, the multiplexed bus 80 is formed on backplane 81 of the central station 50. An additional backplane 117, in parallel with backplane 81, carries the ISA bus 116. The functions of and electrical connections for the multiplexed and ISA busses 80 and 116, respectively, are described in detail below.

Mounted onto the backplane 81 and backplane 117 are line interface cards 70, signal processing cards 90, a timing card 110 and the AT card 40. Additionally, a standard VGA card 150, for controlling a monitor in diagnostic console 140 (FIG. 1), and an ISA Ethernet card 152 are mounted in the central station 50, the functions of these cards being known to those skilled in the art. A management console 141 communicates with the system as an Ethernet node.

The VGA card 150, Ethernet card 152, timing card 110, SCSI interface 115 and the AT card 40 are plugged into specific slots on backplane 117 in central station 50, and all these cards communicate to each other via the ISA bus 116 (FIG. 3). The line interface cards 70 and the signal processing cards 90 are plugged into the remaining slots in central station 50. The line interface cards 70 and the signal processing cards 90 communicate with each other via multiplexed bus 80. The signal processing cards 90 are also connected to the ISA bus 116.

Those skilled in the art will recognize that the line interface cards 70 and signal processing cards 90 may be connected to multiplexed bus 80 in a variety of manners. If enough 64 pin DIN connector slots are available on the backplane 81 in the central station 50, all the line interface cards 70 and signal processing cards 90 may be physically plugged into slots as shown in FIG. 2. However, if the network has a large number of digital dictation stations 20 and transcription stations 30, many line interface cards 70 and signal processing cards 90 will be required. In this case, the number of slots on backplane 81 may be exceeded by the required number of line interface cards 70 and signal processing cards 90. Therefore, a ribbon cable or other connector familiar to those skilled in the art may be used to connect some of the line interface cards 70 and/or signal processing cards 90 to the multiplexed bus 80.

The line interface cards 70 can be connected to a running system ("hot plugged"). The line interface cards 70 have extended power and ground pins (not shown). Therefore, when these cards are plugged into a slot of a running system, the circuitry on the card is powered-up before receiving command and data signals. The electronic circuits on the line interface cards 70 are therefore relatively stable before signals begin arriving. This feature of the line interface cards 70 helps prevent lock-ups of the system due to randomly generated noise when a card is first connected to the present system. Those skilled in the art will recognize that being able to plug the line interface cards 70 into a running system allows upgrades and maintenance without turning off all or part of the central station 50.

Figure 4:
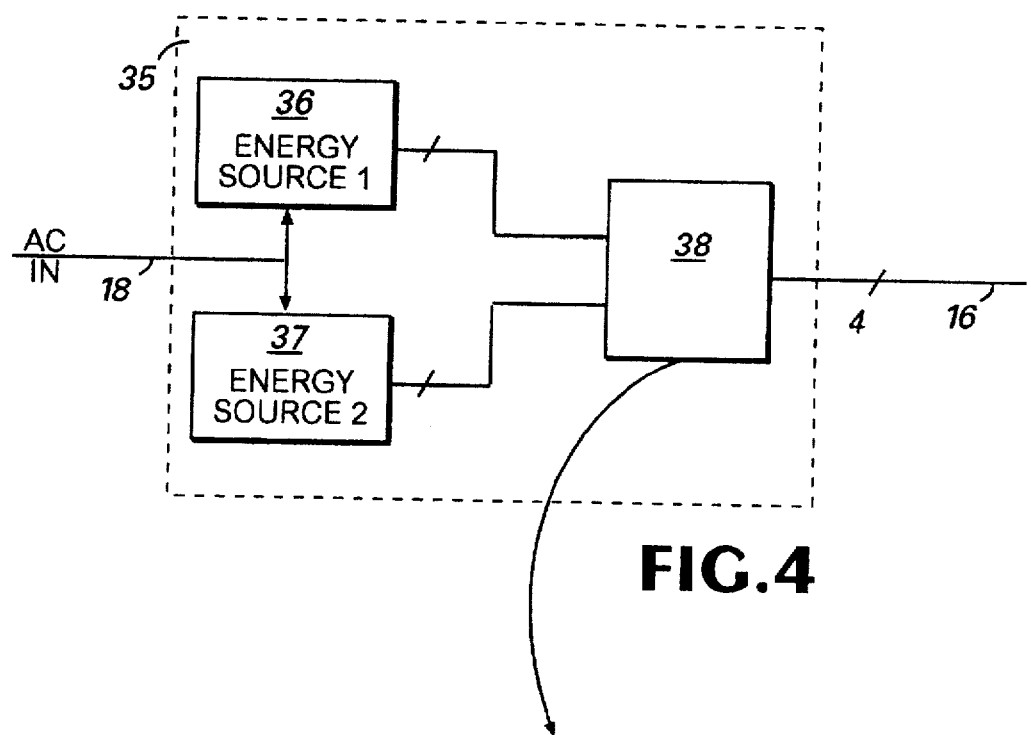
FIG. 4 is a block diagram of the power supply that provides power to the rest of the central station in the present invention.

It is imperative that embodiments of the present invention be operational as close to one-hundred percent of the time as possible. To that end, a redundant power supply is provided for the central station. Referring now to FIG. 4, a block diagram of the power supply 35 for the central station 50 in the present invention is set forth. It is important that the power supplied to the central station 50 never be turned off, especially in medical environments. Therefore, the power supply 35 is a redundant, uninterruptable power supply. The power supply 35 in the present invention is comprised of two redundant energy sources, 36 and 37. The energy sources, 36 and 37, are standard power supplies for computer systems, receiving AC power input on line 18 and outputting DC voltages on lines 16. Each energy source 36 and 37 has a full set of fuses and filters so that it can independently power the central station 50. The operation of the individual energy sources 36 and 37 is known to those skilled in the art. A redundancy circuit 38 ensures that one of the energy sources, 36 or 37, is always receiving AC power input and powering the central station 50.

Figure 4A:
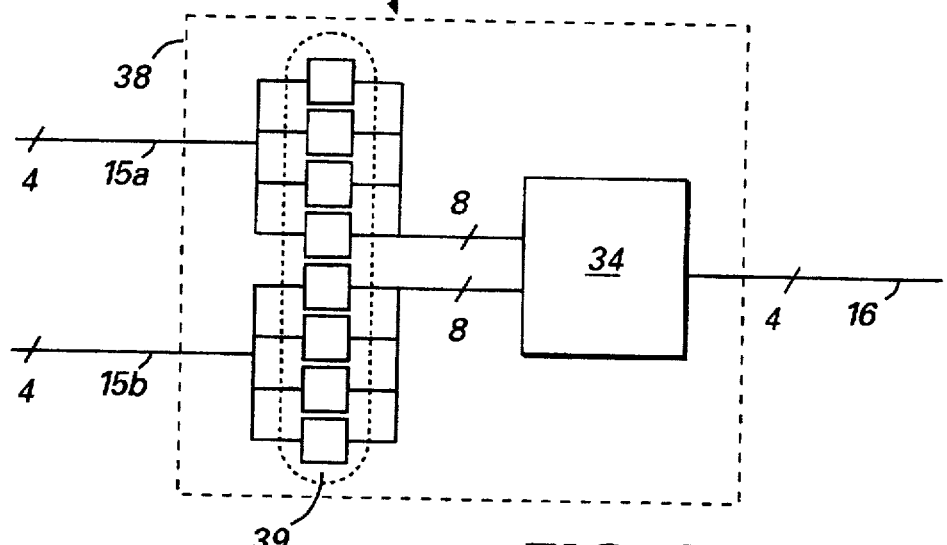
FIG. 4A shows a detailed block diagram of the power supply selector in the preferred embodiment of the present invention.

FIG. 4A is a block diagram of the power supply redundancy circuit 38 in the preferred embodiment of the present invention. The two energy sources, 36 and 37, each output the full complement of DC power required by the central station 50 on lines 15a or b: +12V, -12V, +5V and -5V. Each output power signal is tested by testers 39, which are comparators or other voltage and current sensors that determine if the output from energy sources 36 and 37 on lines 15a and b are at the appropriate levels. Devices such as testers 39 are familiar to those skilled in the art.

The tested power signal plus a control signal are output from each tester 39 and enter a comparator 34. If any of the output signals of the energy sources 36 or 37 are inadequate, as indicated by the control signals, the outputs from that energy source 36 or 37 are not used and a service request issues in the form of a lit LED (not shown). If all the outputs from both energy sources 36 and 37 are adequate, the comparator 34 selects which energy source, 36 or 37, powers the central station 50 via power on lines 16. The comparator 34 may be a timer that switches between energy sources 36 and 37 or it may use one energy source exclusively until the power output from that energy source fails as determined by testers 39. Alternatively, the energy sources 36 and 37 can power share via a network of ORed diodes (not shown). In this embodiment, the energy source outputs are ORed and the greater DC signal level is used. The redundant power supplies help prevent interruption of the system.

II. Control Structure

Briefly referring back to FIG. 2, files are opened in the AT card 40 to hold digitized dictation pending transcription. The software in the AT card 40 controls the receipt of data from dictation stations 20, storage of the digitized dictation, and transmission of data to transcription stations 30. The lower-level processing of digitized dictation signals into or from the central station 50 is controlled by the timing card 110, line interface cards 70 and signal processing cards 90 (section 52 in FIG. 2). Because the operation of the AT card 40 provides a higher level view of the operation of the central station 50, the control of data in the AT card 40 is set forth first. Then, operation of the components in section 52 is set forth. The detailed flow of data in the AT card 40, line interface cards 70, and signal processing cards 90 is set forth below in section III concerning the flow of data.

A) The AT Card

The AT card 40 is a controller for storing and retrieving files containing digitized dictation. Using the descriptions herein, those skilled in the art will recognize that controllers other than the AT card 40 can perform the below described functions. The AT card 40: (1) allows the user to start-up the modular digital dictation system 10 (FIG. 1) via the management console 140, (2) receives and sends digitized dictation signals to and from the signal processing cards 90, (3) stores and retrieves files containing dictation segments in memory 130, (4) generates a header and inserts it with each digitized dictation segment in a file, and (5) communicates with the signal processing cards 90, as set forth above.

In the preferred embodiment of the present invention, the AT card 40 (FIG. 1) is a controller or a personal computer, well known to those skilled in the art, that is dedicated to running the modular digital dictation system 10 of the present invention. In the preferred embodiment, the AT card 40 is an IBM AT personal computer, specifically including a 80486 microprocessor running the OS/2 operating system. However, other microprocessors or operating systems well known to those skilled in the art may be used. The OS/2 operating system program is a multitasking system, broadly meaning that it can support many application programs running at the same time.

Referring now to FIG. 5, a block diagram of the software modules and interfaces used in the preferred AT card 40 within modular digital dictation system 10 is disclosed. As can be seen in FIG. 5 the AT card 40 includes many software modules that interface with the hardware in modular digital dictation system 10, such as the line interface cards 70, signal processing cards 90, hard disk drive 218 and disk memory 130. The software modules are usually stored in hard disk drive 218. The many lines connecting the software modules represent direct transfer of data and commands between software modules.

The AT card 40 serves to accept data from digital dictation stations 20 via the timing card 110, line interface cards 70 and signal processing cards 90. The detailed operation of the timing card 110, line interface cards 70 and signal processing cards 90 is set forth below.

As fully described below, data is provided to the AT card 40 at a fixed location on the AT bus 116 (FIG. 2). Program 198a is a Dynamic Link Library (DLL) programs that, together with device drivers 198b and 198c, serve to interface the memory 130, signal processing cards 90 and timing cards 110, respectively, with the AT card 40. The DLL programs 198a, b, and c drive the signals that are passed between the hardware device (or a controller for the hardware device such as the SCSI interface 115) and the AT card 40. Those skilled in the art are familiar with programs such as the DLL programs 198a, b and c.

Digitized dictation is passed to and from the AT card 40 via the signal processing card 90 and program 198b. As described in detail below, the executable program 198b is executed by two processors in the signal processing card 90. One Interprocess Kernal I/O (IKI) manager program 200a–n is operating for each dictation or transcription station, 20 and 30 respectively, that is communicating with the central station 50. Each IKI manager program 200a–n recognizes when data is available from the signal processing card 90, as will be discussed in greater detail below, and passes the data to one of the file managers 200a–n.

There is one file manager program 134a–n running for each active dictation and transcription station, 20 and 30 respectively. The file managers 134a–n manage the communication of information with the signal processing cards 90. Specifically, the file managers 134a–n interface with the "mirror" program 198a to instruct the mirror program 198a when to create, update, and close files, and controls the flow of data between the signal processing cards 90 and the files in memory 130.

The file managers 134a–n are connected to the records manager 216. The records manager 216 contains tables that include job numbers, record identification numbers, length of files and status information. Each table is built at boot-up by reading the job record information of any files in memory 130. The information about each file that is created, opened or closed is passed to the records manager 216 by the file managers 134a–n. The tables are described in detail below.

Although the operation of the software in the AT card 40 in storing and retrieving files and the console 140 are detailed in Section III below, a brief overview of these two aspects of the system are now provided. The central station 50 includes memory 130 that comprises at least 120 Mbytes of space for storing files of digitized dictation signals and 120 Mbytes of space for redundant storage of the digitized dictation signals. The memory 130 is preferably a hard disk drive familiar to those skilled in the art. The AT card 40 communicates with the memory 130 via the SCSI interface 115 (including a controller card and drivers) familiar to those skilled in the art, to store and retrieve the digitized dictation signals that originate at the dictation stations 20, as will be described in Section III, below.

The database manager 220, server 222 and the other software routines on the AT card 40 interface the AT card 40 with the management console 140 to provide a database 224 of information concerning the files in memory 130 to console 140. The database manager 220 is a communication interface between the server 222 and the database manager 220, as is familiar to those skilled in the art. The database 224 is checked against the job record information found in the header in each file opened in memory 130.

Any additions, changes or deletions in the database 224 are performed by the database manager 220. For example, when a dictation session begins, job record information is passed from file manager 134a–n through the records manager 216 to the database manager 220. The database manager 220 then accesses the database 224 and creates a new record in the job records table. The console 140 accesses the database 224 for reading and updates via the database manager 220 and server 222.

The management console 140 is personal computer, including a floppy drive, hard drive, printer port, driver and card, a monitor and keyboard that allow operator interface with the AT card 40 in the modular digital dictation system 10 for control and monitoring purposes. For example, the management console 140 is programmed to access the database 224, archive information, and display information. Those skilled in the art are familiar with applications created under the "WINDOWS"™ operating system for accessing and display information in a database. Therefore, the software modules in the management console 140 are not described in detail herein. The implementation of management console 140 is known to those skilled in the art.

B) Control of Data Into and From the Central Station

The apparatus controlling data flow into and from the central station 50 roughly corresponds to Section 52 in FIG. 2. Section 52 is controlled by timing card 110. Specifically, the timing card 110 facilitates communications between the AT card 40 and the line interface and signal processing cards, 70 and 90, on the multiplexed bus 80, provides control signals to the line interface cards 70 and signal processing cards 90, and provides clock and synchronization signals to the time division multiplexed bus 80.

1) Timing Card

Figure 5B:
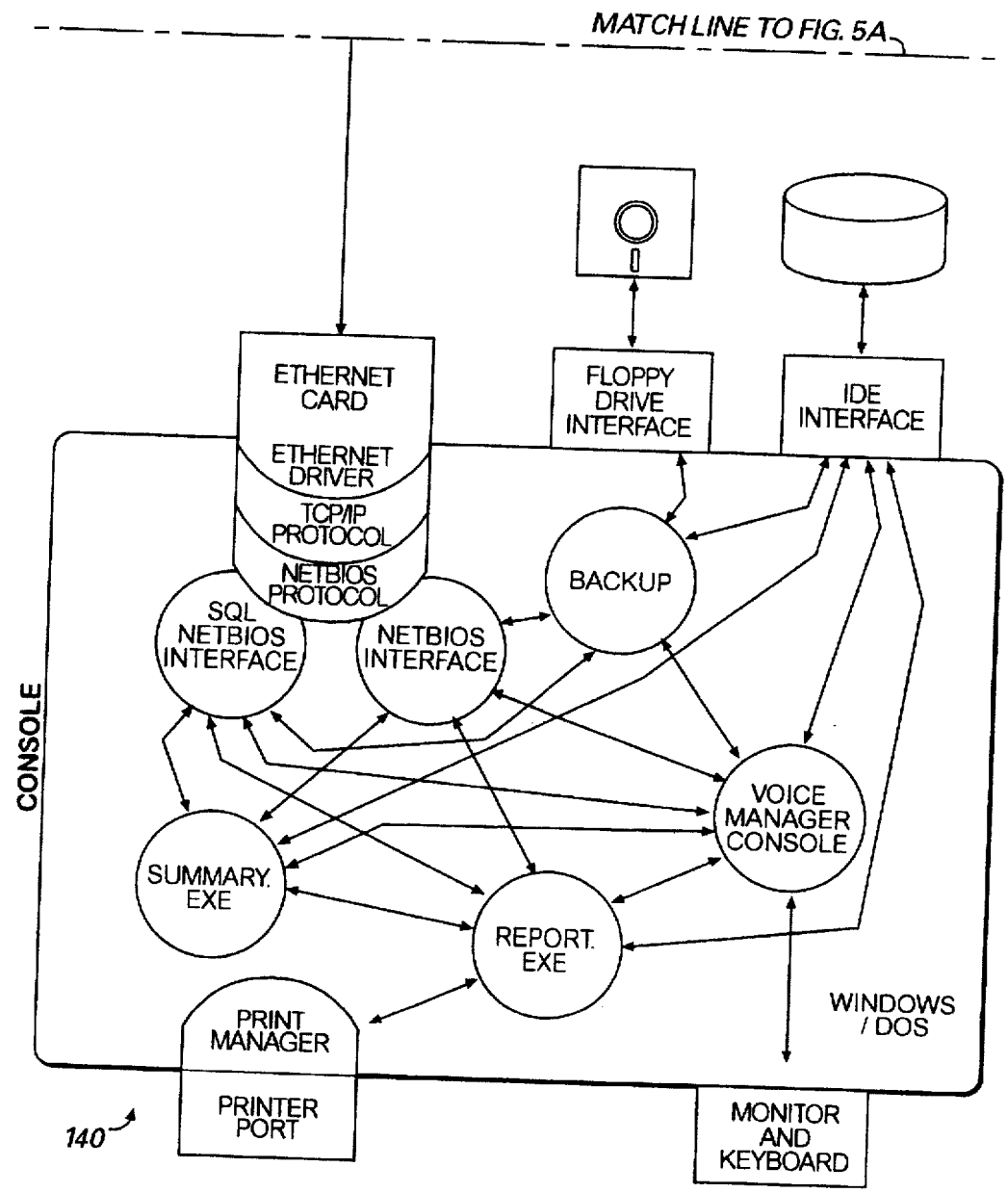
FIG. 5 is a block diagram of the software and the communication paths among modules of the software within the preferred embodiment of the present invention.
Figure 6:
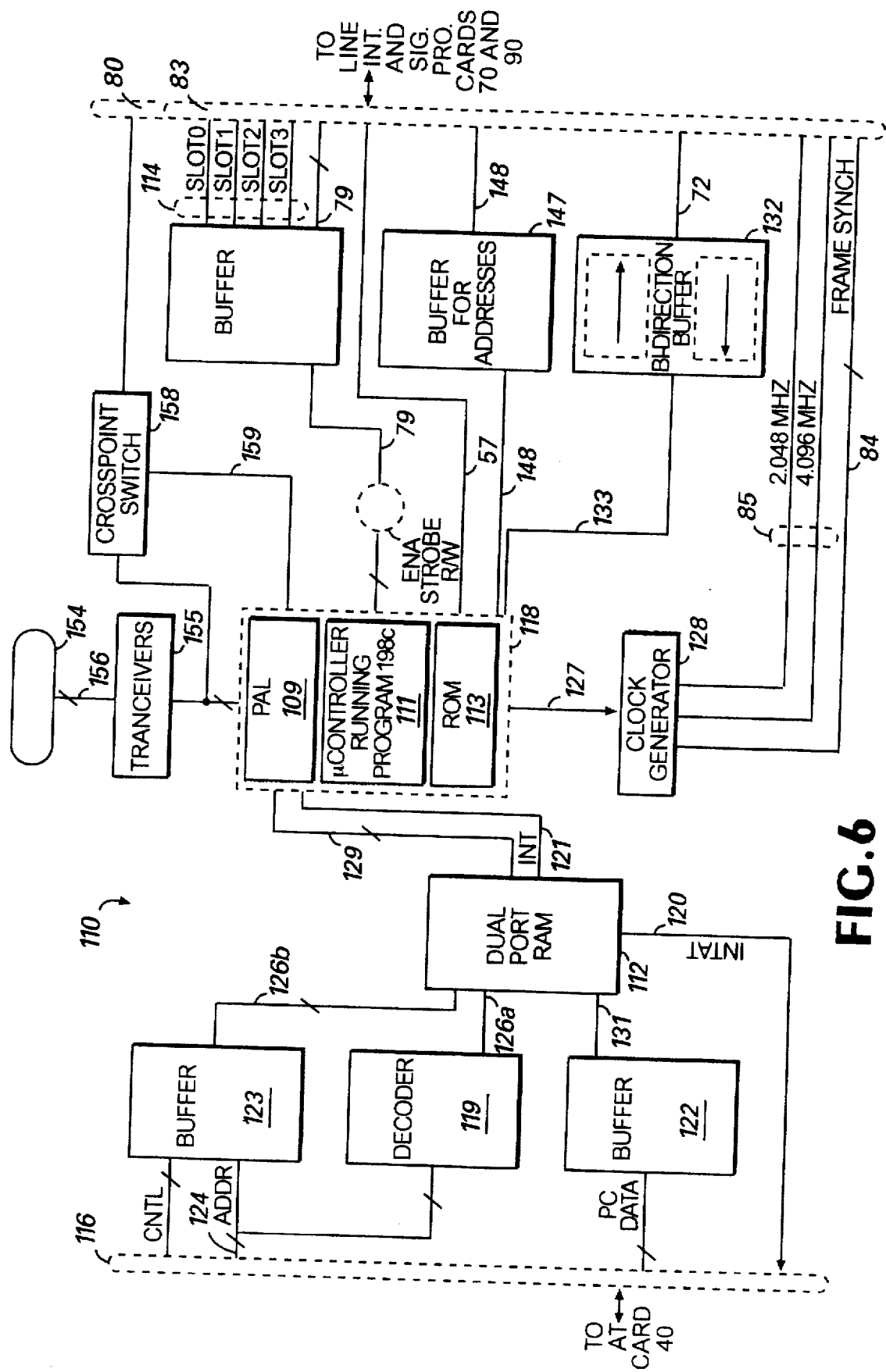
FIG. 6 is a block diagram of the timing card in the preferred embodiment of the present invention.

Turning to FIG. 6, a block diagram of the timing card 110 in the preferred embodiment of the present invention is shown. The controller 118 is comprised of a Programmable Array Logic (PAL) chip 109, a microcontroller 111 and ROM 113. In the preferred embodiment, the microcontroller 111 is the 68HC11E1 eight bit microcontroller manufactured by Motorola Corp. The program 198c (FIG. 5) run by the microcontroller 111 is stored in a read only memory device 113, which is a flash ROM P28F010 produced by Intel, Inc., but can be many different sizes and makes of ROM or other memory device familiar to those skilled in the art. The PAL chip 109 is product number PALCI6L8 manufactured by Cypress Semiconductor Referring to FIGS. 5 and 6, when the timing card 110 is first powered up, the microcontroller 111 begins executing the program 198c stored in ROM 113. The program enables the microcontroller 111 to assume control over RAM 112 in a manner familiar to those skilled in the art. Once the timing card 110 is powered-up, it awaits a start-up message from the AT card 40 in RAM 112.

Continuing with FIG. 6, all messages sent between the AT card 40 and the timing card 110 pass through the dual-port RAM 112, which may be written or read by either the AT card 40 or the microcontroller 111. The AT card 40 reads or writes RAM 112 via ISA bus 116.

The address that the RAM 112, and thus the timing card 110, occupies on the ISA bus 116 is preconfigured by switches (not shown) on the timing card 110, in a manner familiar to those skilled in the art. The dual port RAM 112 is 1K byte in the preferred embodiment, although it may be larger or smaller if desired. The timing card 110 occupies up to a 2k byte area between 0C0000 and 0FF800 (in the hexadecimal numbering system) on the ISA bus 116. Address decoder 119 monitors the upper bits of the address on lines 124 to determine when the timing card 110 is being addressed by the AT card 40. The decoder output on line 126a is set to indicate when the timing card 110 is addressed. The remaining control and address signals pass through buffer 123 to RAM 112 via bus 126b and on to controller 118 via bus 129.

Continuing with FIG. 6, an interrupt signal on line 121 generated by the contents of particular locations in dual port RAM 112 informs the microcontroller 111 that a message has been written by the AT card 40 to RAM 112 in the timing card 110. Messages pass from the ISA bus 116 through a buffer 122 onto bus 131 into RAM 112. Likewise, an interrupt signal on line 120 generated by the microcontroller 111 signals AT card 40 that the timing card 110 has written a message to the RAM 112 via bus 129. The AT card 40 reads messages from RAM 112 when the interrupt signal on line 120 is set. Messages from the microcontroller 111 pass through RAM 112 to buffer 122 via bus 131. Contention for the RAM 112 between the microcontroller 111 and the AT card 40 is controlled by microcontroller 111.

At start-up of the modular digital dictation system 10 (FIG. 1), the AT card 40 places an interrupt signal on line 121 and requests a list of cards that are in the slots on the multiplexed bus 80 by placing a message in dual port RAM 112. In response, the timing card 110 polls all the slots available for cards connected to the multiplexed bus 80 and reports back to the AT card 40 via RAM 112. An address decoder (not shown) on the backplane 81 for multiplexed bus 80 decodes the slot address 114 from the timing card 110 and provides the slot enable to each individual line interface card 70 and signal processing card 90 connected to bus 80 (FIGS. 2 and 3). The AT card 40 will utilize all this information to initialize the line interface cards 70 and the signal processing cards 90 for communications, as is set forth below.

Returning to FIG. 6, the timing card 110 outputs slot signals 0–3 on lines 114 of the communications bus 83. This is a 4-bit address driven by the microcontroller 111 that allows each card on the multiplexed bus 80 to identify the slot in which it resides. Typically, at start-up, reset, or when a line interface card 70 or signal processing card 90 is inserted into a running system, the card will identify its slot by reading the slot address on lines 114 during an access by the timing card 110 via the enable signal (ENA) on bus 79. Once the card has determined its address from the timing card 110 via lines 114, it can be uniquely addressed by the timing card 110 and accept commands from the timing card 110.

The timing card 110 uses a communications bus 83 to control and address each line interface card 70 and signal processing card 90. The communications bus 83 is considered herein to be a subcomponent of the multiplexed bus 80, and is formed on backplane 81 (FIG. 3).

Figure 9:
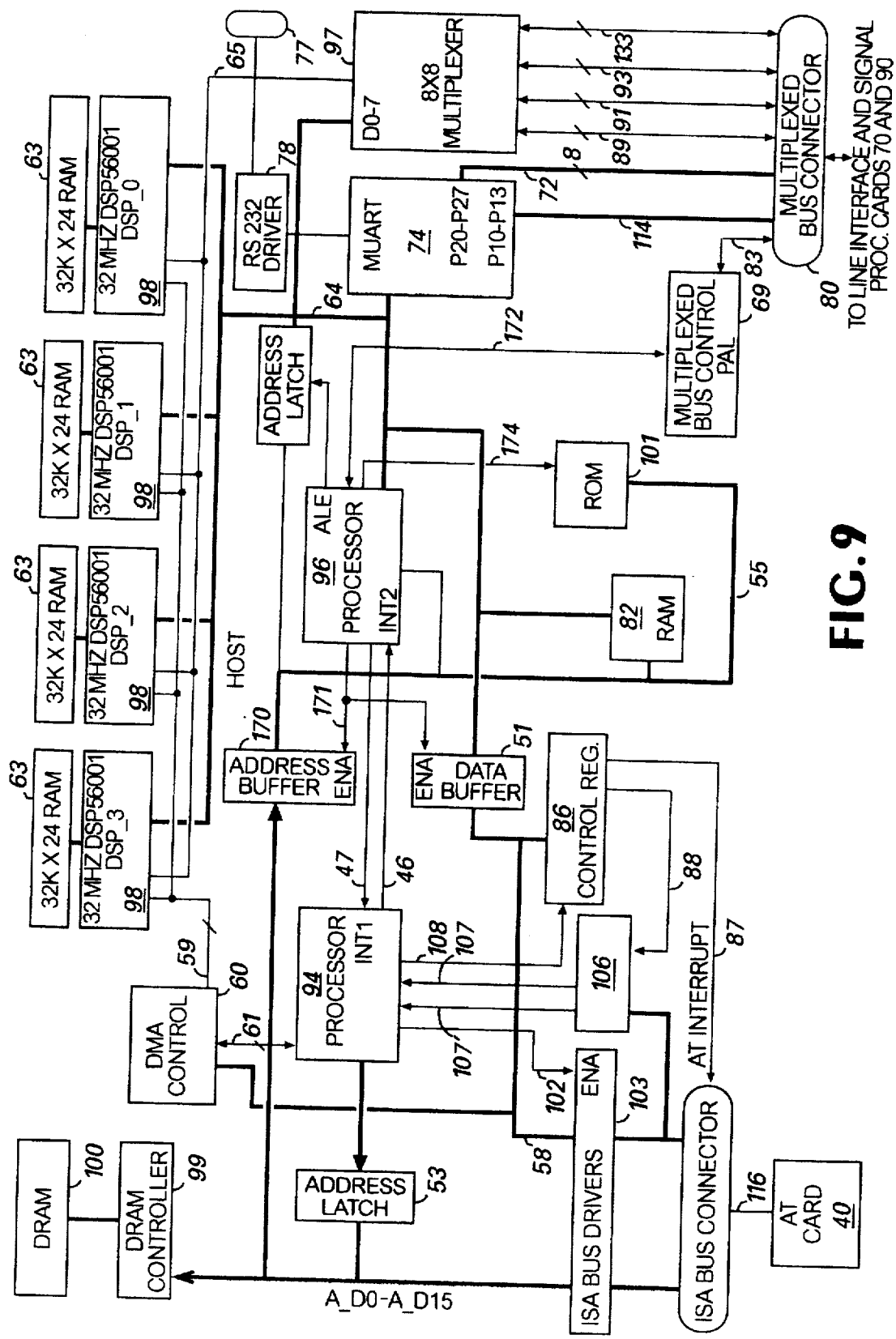
FIG. 9 is a detailed diagram of a signal processing card in the preferred embodiment of the present invention.

Continuing with FIG. 6, the timing card 110 uses the communications bus 83 to determine what type of cards are connected to the multiplexed bus 80. As set forth above, each slot on the multiplexed bus 80 has a unique address, that address accesses a memory address in ROM on the card that rests in the slot. The timing card 110 accesses the first address in the ROM on each card connected to the multiplexed bus 80. The accessed ROM is the ROM in command interpreter 68 (FIG. 7) on line interface cards 70 and the ROM 101 on signal processing cards 90 (FIG. 9). As shown in the timing card 110 in FIG. 6, the microcontroller 111 and PAL 109 generate the address for accessing each card, and pass the addresses on lines 148 to buffer 147. The address lines 148 enter the cards on the multiplexed bus 80 as part of communications bus 83. The ROMs on each card are preprogrammed with a number at the first address in ROM indicating the type of card in the slot. For example, the first address in ROM would be "10" if a signal processing card 90 was in the slot, and the first address would be "20" if a line interface card 70 was in the slot. The timing card 110 reports this information back to the AT card 40 via RAM 112.

Handshaking between the timing card and the line interface and signal processing cards, 70 and 90, occurs in a protocol known to those skilled in the art as "interlocked handshaking." Referring to FIG. 6, the communications bus 83 includes four handshaking/control signals on lines 79 from the timing card 110. The control signals on lines 79 are generated by the PAL 109 and the microcontroller 111 and are used for communications between the timing card 110 and the line interface and signal processing cards, 70 and 90. The four control signals that regulate message transfer are: /ENA, /STROBE, and R/W on bus 79 and /ACK on line 57. The addressed line interface card 70 or signal processing card 90 responds to the /ENA, /STROBE and R/W signals with an /ACK signal on line 57. Messages on data bus 72 are read by the addressed card before it sends the /ACK response on line 57. The data buffer 132 is a bi-directional buffer for messages passed between the timing card 110 and the line interface and signal processing cards, 70 and 90, respectively, on data bus 72.

The AT card 40 sends several other messages to the timing card 110, including card enable and disable controls. Likewise, the timing card 110 sends messages to the AT card 40 when it detects errors emanating from a card, when a request for service of a card occurs, or when a new line interface card 70 is plugged into the central station 50. All these messages are passed through RAM 112.

2) Control of the Line Interface Cards

Figure 7:
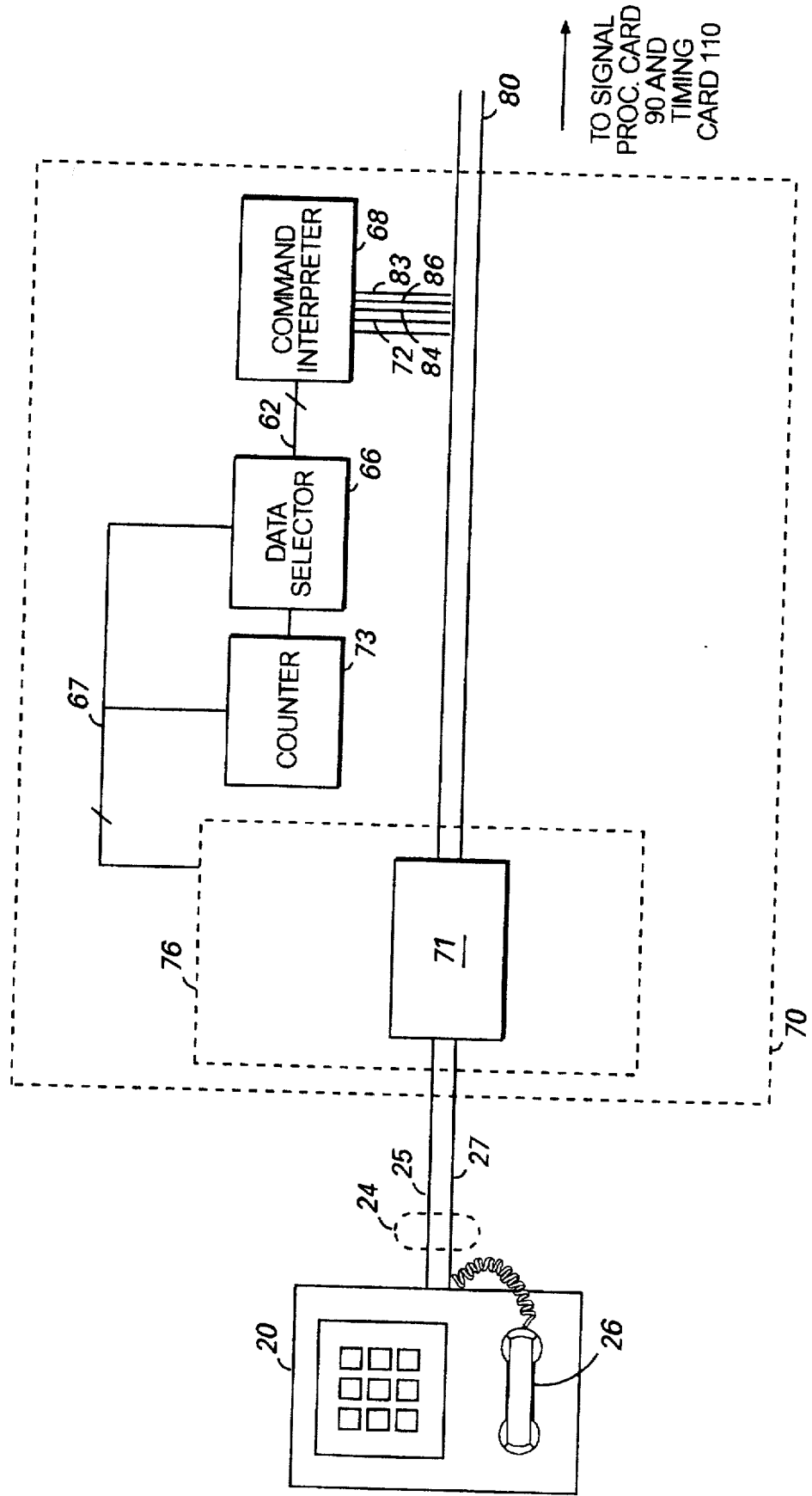
FIG. 7 is a block diagram of communication between a digital dictation station and a line interface card in the central station.

Referring now to FIGS. 6 and 7, a discussion of control of a line interface card 70 by the timing card 110 is set forth. Control signals and messages from the timing card 110 to the line interface cards 70 are sent via the communications bus 83 that forms part of multiplexed bus 80 (FIG. 7).

Each line interface card 70 includes a command interpreter 68. The command interpreter 68 includes an address decoder (not shown), a latch (not shown) and a ROM data buffer (not shown). When the timing card 110 properly addresses a line interface card 70, control data enters the latch. Outgoing data on lines 72, read from the ROM buffer in command interpreter 68, identify the line interface card 70 for the timing card 110, as was discussed above.

The command interpreter 68 also includes a programmable array logic (PAL) chip that evaluates the address lines, the read/write (R/W) lines, the STROBE line, and the enable (ENA) line on command bus 83 to determine whether an access to the line interface card 70 is a write or a read. The command interpreter 68 also generates the ACKNOWLEDGE (ACK) signal that is placed on command bus 83. Circuits that perform the above functions described in conjunction with the command interpreter 68 are familiar to those skilled in the art.

At system start-up, after reset of the central station 50 or after being plugged into a running system, each line interface card 70 is initialized by the timing card 110. The timing card 110 writes the number of the beginning time slot for each line interface card 70 on lines 72 and into the latch in the command interpreter 68. The number of the beginning time slot is sent from the command interpreter 68 to the data selector 66 over line 62.

The data selector 66 and counter 73 in each line interface card 70 are used to multiplex the digitized dictation signals received from the dictation stations 20 onto multiplexed bus 80. The data selector 66 and counter 73 also serve to demultiplex digitized dictation signals from the multiplexed bus 80 to be sent to transcription stations 30. Each counter 73 is preloaded with a 5-bit number provided by timing card 110 via communications bus data lines 72. Each counter 73 is synchronized with the frame synchronization signal on line 84 and counts using one of the clocks from lines 85. The counter 73 outputs a block enable signal on lines 67 to enable the group 76 of transceivers 71 to receive and output data. The number preloaded into the counter 73 determines upon which of the time slots on multiplexed bus 80 the transceivers 71 in each line interface card 70 will transmit or receive, and the block enable signal enables the transceivers 71 at the appropriate time.

The different counters 73 on the line interface cards 70 are preloaded with different numbers. Each block of transceivers 76 is active for a preselected number of time slots, as determined by its block enable signal on lines 67 emanating from its counter 73. The system sequentially activates the blocks of transceivers on the line interface cards 70. Each block of transceivers 76 on each line interface card 70 always occupies the same time slots for which it is activated by its counter 73. Therefore, if some or all of the transceivers 71 in a block of transceiver 76 are not transmitting or receiving digitized dictation signals when the block enable signal for that line interface card 70 is active, the time slots dedicated to those transceivers 71 are not used.

Once each counter 73 on every line interface card 70 is programmed, other signals from the timing card 110 can enter the command interpreter 68 and data selector 66 to control the flow of data through transceivers 71. The flow of data through the line interface cards 70 is discussed below.

In the preferred embodiment, data entering the central station 50 passes through a line interface card 70 (FIG. 1). However, it is also desirable to be able to receive external digitized voice and data from a Digital Channel Selector (DCS) (not shown), familiar to those skilled in the art. Briefly, referring back to FIG. 6, a DCS can provide external digitized voice and data via connector 154 directly to timing card 110 (FIG. 6). A line interface card 70 (FIG. 1) is not required when a digital data source is connected to the AT card 40 via a DCS. The digitized voice and data on bus 156 (FIG. 6) enters transceivers 155 on the timing card 110, and is passed to a cross-point switch 158 which is embodied by the same chip as multiplexer 97 discussed in relation to FIG. 8. The cross-point switch 158 is controlled by microcontroller 111 via lines 159, which determines signal direction. DCS digitized voice and data signals entering timing card 110 are routed onto bus channels 89 and 91 and to a signal processing card 90. Those skilled in the art will recognize that any signal source that provides data in µ-law format can provide data directly to the timing card 110, as set forth above, bypassing the line interface cards 70.

3) Control of Signal Processing Cards

Figure 8:
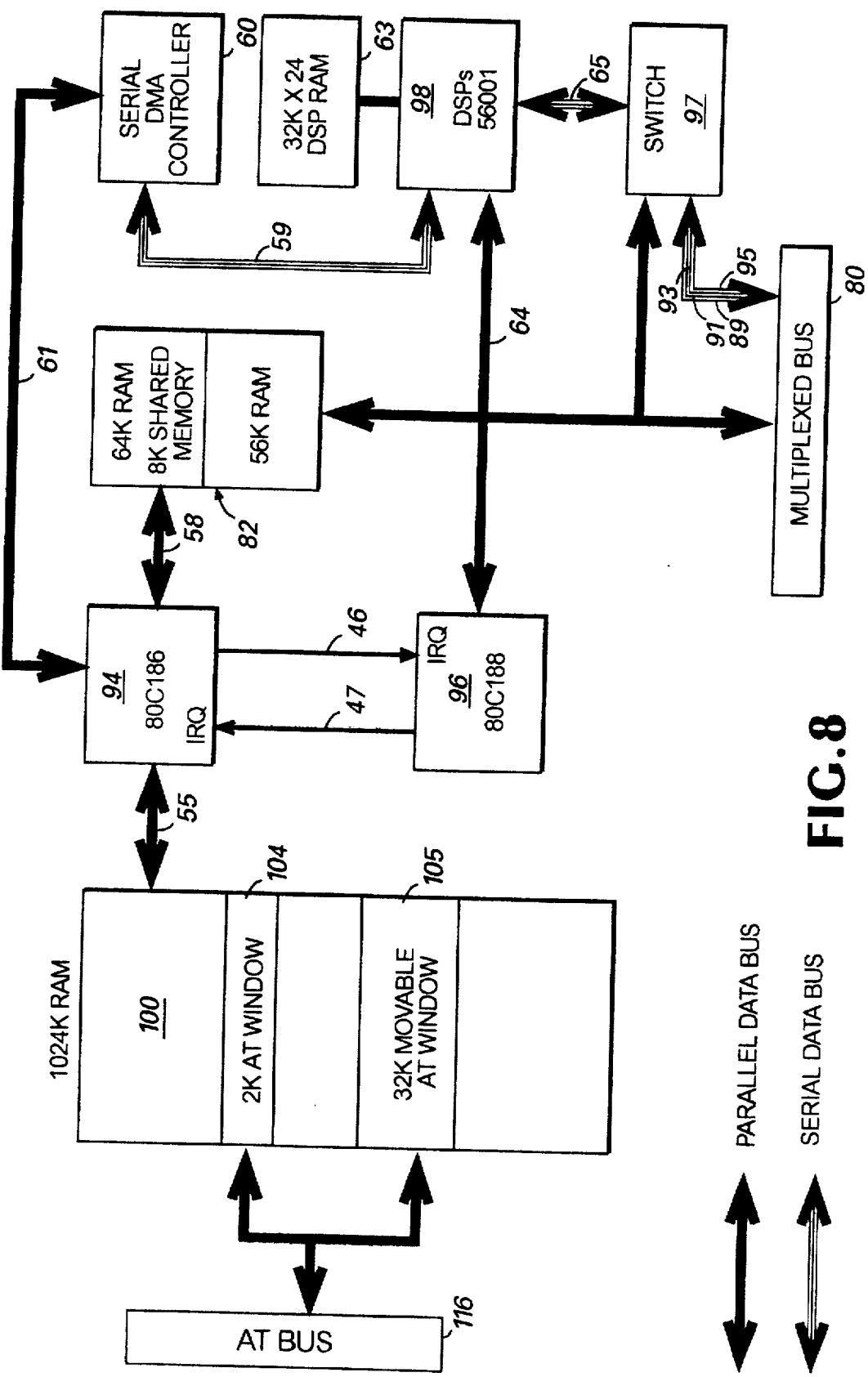
FIG. 8 is a block diagram of the signal processing cards in the preferred embodiment of the present invention.

Referring now to FIGS. 8 and 9, start-up of a signal processing card 90 is described. Turning first to FIG. 9, at system start-up, or after a system reset, the tertiary processor 96 in a signal processing card 90 accesses its operating program stored in ROM 101. The tertiary processor 96 begins operating on the code in ROM 101. Control lines 174 connect the tertiary processor 96 to the ROM 101. The tertiary processor 96 interrupts the secondary processor 94 via line 47, and transfers part of the code stored in the ROM 101 into DRAM 100 via lines 55. The tertiary processory 96 controls buffer 170 via an enable signal on line 171 to allow access to DRAM controller 99 and DRAM 100.

After the secondary processor 94 loads its portion of the operating program into DRAM 100, the secondary processor 94 continues execution of the code in DRAM 100 without interrupting the tertiary processor 96. The secondary processor reads and writes to DRAM 100 via address latch 53. Thus, both processors 94 and 96 are operational via their software, which was collectively referred to as program 198b in FIG. 4. The tertiary processor 96 also controls boot-up of the digital signal processors 96, in a manner known to those skilled in the art.

The address of each signal processing card 90 is set by the timing card 110 addressing ROM 101, as was discussed above (FIG. 6). Once its processors 94 and 96 are operating, a signal processing card 90 can communicate with the timing card 110. The data portion of the communications bus 83 enters the signal processing cards 90 as the 8-bit communications bus data lines 72 (FIG. 9). A MUART 74 receives commands on bus 72 from the timing card 110.

The multiplexed bus control PAL 69 monitors and controls handshaking between the signal processing card 90 and the timing card 110. The control PAL 69 receives and reads the /ENA, R/W, and /STROBE signals from the communications bus 83 and generates the /ACK signal on line 57 (FIG. 6). The control PAL 69 is connected to the tertiary processor 96 via lines 172.

The signal processing cards 90 can also be accessed via an RS-232 driver 78 and associated serial port 77. The tertiary processor 96 controls the serial port 77 and the RS-232 driver 78 on the signal processing card 90 through the MUART 74. In a signal processing card 90, the four most significant bits of command bus 72 are Clear to Send, Data Set Ready, Request to Send and Data Terminal Ready, signals familiar to those skilled in the art. Serial port 77 and RS-232 driver 78 allow the signal processing cards 90 to communicate with other systems.

As can be seen in FIG. 9, the transfer of digitized dictation signals into and out of the signal processing cards 90 entails the use of three bus channels 89, 91 and 93. The three bus channels 89, 91 and 93 enter the signal processing card 90 from multiplexed bus 80. Each of the bus channels carries up to thirty-two (32) channels of digitized dictation signals.

Each signal processing card 90 can be assigned to any time slots on any bus channel 89, 91 or 93. The AT card 40 controls the assignment of signal processing cards 90 to time slots using the timing card 110. The timing card 110 sends a message to tertiary processor 96 via communications bus 72 that determines the assigned bus channel, 89, 91 or 93, and time slots. Since the signal processing cards 90 time slot and bus channel assignments are assigned with software, there are no fixed assignments and every signal processing card 90 can communicate on any time slot or bus channel that is physically supplied to the card 90. The signal processing cards 90 are ready to communicate after being assigned time slots and bus channels.

In the preferred embodiment of the present invention, each signal processing card has access to all four bus channels 89, 91, 93 and 95. Those skilled in the art will recognize that the number of channels in the system is variable by scaling the preferred embodiment up or down.

Continuing with FIGS. 1 and 9, the line interface cards 70 and signal processing cards 90 are prepared for operation at start-up of the modular digital dictation system 10. Furthermore, the timing card 110 periodically polls each address on the multiplexed bus 80 to determine if a new card is connected to the central station 50. If the timing card 110 detects a card at a previously empty address, the timing card 110 initiates communication with the card, and prepares the card for communication of digital dictation signals. Therefore, line interface cards 70 may be added to the central station 50 to expand the capacity of the modular digital dictation system 10 while the system is running.

Referring to FIG. 9, an intercom feature is provided via lines 133 in the preferred embodiment of the present invention. Control signals from timing card 110 on lines 133 allow digitized voice signals to pass from one signal processing card 90 to other signal processing cards 90. The voice signals are output on the voice output channels dedicated to the receiving signal processing cards 90. Therefore, the voice signals are passed through the line interface card(s) 70 and to transcription stations 30 assigned to receiving signal processing cards 90. Thus, voice signals can be broadcast to other stations, 20 or 30, from one dictation station 20. Control signals on lines 133 control transfer of the voice signals on to the appropriate bus for broadcast to the appropriate stations.

4) Control of the Multiplexed Bus

Referring back to FIG. 6, the timing card 110 controls the multiplexed bus 80. The multiplexed bus 80 has two clocks, on lines 85, that are provided to bus 80 by a clock generator 128 on the timing card 110 in the preferred embodiment. The clock generator 128 receives a 8.192 MHz signal from a crystal oscillator (not shown) and divides the signal down in a manner familiar to those skilled in the art. The first clock is a 4.096 MHz signal that is used by Mitel compatible devices. The second clock is a 2.048 MHz clock signal that is used as the bit clock for data transfer in other standard systems.

Furthermore, three synchronization signals are supplied on lines 84. A frame synchronization signal indicates the start of a frame of data on muxbus 80. Having three synchronization signals, despite the fact that only one is used in a running system, permits the bus 80 to be compatible with a plurality of different systems, including the Signal Computing System Architecture, PCM expansion bus (PEB), and Multi-Vendor Integration Protocol (MVIP). In the preferred embodiment of the present invention, all the clocks and synchronization signals provided by the timing card 110 are synchronized, thereby reducing system noise.

When ready to initiate communications with the dictation stations 20 and transcription stations 30, the file manager 134a–n (FIG. 5) in the AT card 40 sets up the modular digital dictation system 10 for communications by assigning each signal processing card 90 to a line interface card 70. The AT card 40 sets each line interface card 70 to operate on a particular time slot on multiplexed bus 80 by preloading counters 73 (FIG. 7) As was set forth above, the line interface cards 70 are dedicated to a certain bus channel, 89, 91, 93 or 95, as determined by their hard-wired connection to the multiplexed bus 80. The signal processing cards 90 are assignable to any time slots and bus channels. As was described above, each signal processing card 90 is assigned to a particular bus channel and certain time slots.

These assignments pair each line interface card 70 to a signal processing card 90 to create a communication path on a particular time slot and bus channel on multiplexed bus 80. Once each line interface card 70 is connected to a signal processing card 90, the digitized dictation signals can be passed between the central station 50 and the dictation and transcription stations, 20 and 30, via the line interface cards 70 and the signal processing cards 90. Because the file manager 134a-n sets up each communication path and the files stored in memory 130, the appropriate data is associated in the appropriate file.

The digitized dictation signals are passed between signal processing cards 90 and the AT card 40 via ISA bus 116. The AT card 40 controls the ISA bus 116 in a manner well known to those skilled in the art. In addition, the AT card 40 controls the storage and retrieval of digitized dictation segments in memory 130, as was discussed above.

III. Flow of Digitized Dictation Signals

Now consider the flow of data through the modular digital dictation system 10. Focusing first on the interface between the digital dictation stations 20 and a line interface card 70, digital dictation segments are created in the dictation stations 20. FIG. 7 shows the interface between a digital dictation station 20 and a line interface card 70.

In the preferred embodiment, the wiring 24 connecting the dictation station 20 to the line interface circuit 70 comprises a twisted-pair wire, 25 and 27. The signals "Voice In", "Voice Out", "Communications In" and "Communications Out" are carried on wires 25 and 27 on top of a twenty-four (24) volt power signal. Voice "in" and "out" refer to digitized voice transferred into and out of the central station 50 (FIG. 1), respectively. Likewise, communications "in" and "out" refer to command signals transferred into and out of the central station 50, respectively. The connector (not shown) on the line interface card 70 is an industry standard 25 pin "Champ" type receptacle, known to those skilled in the art. Those skilled in the art will recognize that other cables and/or connectors, such as cables and connectors for telephone lines, in a system where the voice is digitized in the line interface card 70, may be utilized to connect the line interface circuit 70 to the digital dictation station 20.

Continuing with FIG. 7, voice signals are digitized at the dictation station 20 using a coder/decoder ("CODEC"), not shown, familiar to those skilled in the art. Specifically, the digitized voice data is encoded in a µlaw pulse code modulation (PCM) data format that represents the dictation segment. The digitized voice and data from each dictation station 20 is sent via wires 25 and 27 as a series of bits to one of several line interface cards 70.

Those skilled in the art will recognize several acceptable variations to the above described approach to digitization. Specifically, for example, the voice signals may be digitized at the line interface card 70 and wiring 24 could carry analog signals.

Digitized dictation signals transferred from the dictation stations 20 are processed and stored in the central station 50 (FIG. 1). The line interface cards 70 serve as an input/output gateway between the central station 50 and both the dictation stations 20 and transcription stations 30. The interface between the line interface card 70 and a transcription station 30 is equivalent to the interface shown in FIG. 7.

The user of a dictation station 20 will initiate communication through a line interface card 70. For example, if a user of dictation station 20 picks up the microphone 26, taking the microphone 26 "off hook", a "CONNECT" signal is transmitted to the line interface card 70 (FIG. 5). The signal identifies that dictation is about to begin, and includes information such as a user identification number. If the station 20 has a keypad for entry of data, the user will enter his user number using the key pad, and that number will be transmitted to the line interface cards 70. Other data may be provided from the dictation station 20, or will be familiar to those skilled in the art.

a) Data Flow Through Line Interface Cards

Referring to the preferred embodiment of the central station 50 in FIG. 1, there are a plurality of line interface cards 70, each servicing up to eight (8) dictation stations 20 or transcription stations 30, and each connected to the multiplexed bus 80. A line interface card 70 can be connected to maximum of eight dictation stations 20 or transcription stations 30.

The line interface cards 70 have a universal digital loop transceiver (UDLT) 71 associated with each station serviced (FIG. 7), such as is made by Motorola Corporation. The UDLTs 71 are transceivers that receive the sequence of digitized dictation signals containing voice and header data.

The UDLTs 71 also serve to transmit digitized dictation segments that have been stored in the central station 50 to transcription stations 30 (FIG. 1). The UDLTs 71 pass the dictation segments from central station 50 to the transcription stations 30. In the preferred embodiment, the UDLTs 71 are manufactured by Motorola Corp. under the product number MC145422. Those skilled in the art will recognize that other transceivers may be used.

In the line interface cards 70, the voice and signaling bits arriving from dictation stations 20 are arranged into frames and placed on multiplexed bus 80. Alternatively, during transcription, each line interface card 70 takes data from the multiplexed bus 80 and demultiplexes the data onto cabling 23 (FIG. 1).

The line interface cards 70 multiplex digitized dictation signals onto the multiplexed bus 80 using one of the clocks on lines 85 (FIG. 6), the frame synchronization signal on line 84, and data written into command interpreter 68 (FIG. 7). These signals are used to generate a block enable signal on one of the lines 67 that is active for eight (8) time slots in a frame to enable the transceivers in the block transceivers 76. Each UDLT 71 is sequentially activated to transmit or receive using transceiver enable signal on one of the lines 67. The transceiver enable signals on lines 67 are generated using the lower bits of counter 73. The line enable and transceiver enable signals on lines 67 thus control multiplexing of voice and control data onto the multiplexed bus 80.

The line interface cards 70 also demultiplex digitized dictation signals from the multiplexed bus 80. The demultiplexed operation is simply the inverse of the multiplexing operation. The demultiplexed digitized dictation signals are put on cabling 23 (FIG. 1) and received by transcription stations 30. The Voice Out and Communications Out signals are demultiplexed from bus 80 under the control of signals on lines 67 generated by the counter 73 and data selector 66 (FIG. 7) in a like manner to the multiplexing operation.

b) Data Flow On The Multiplexed Bus

Figure 10:
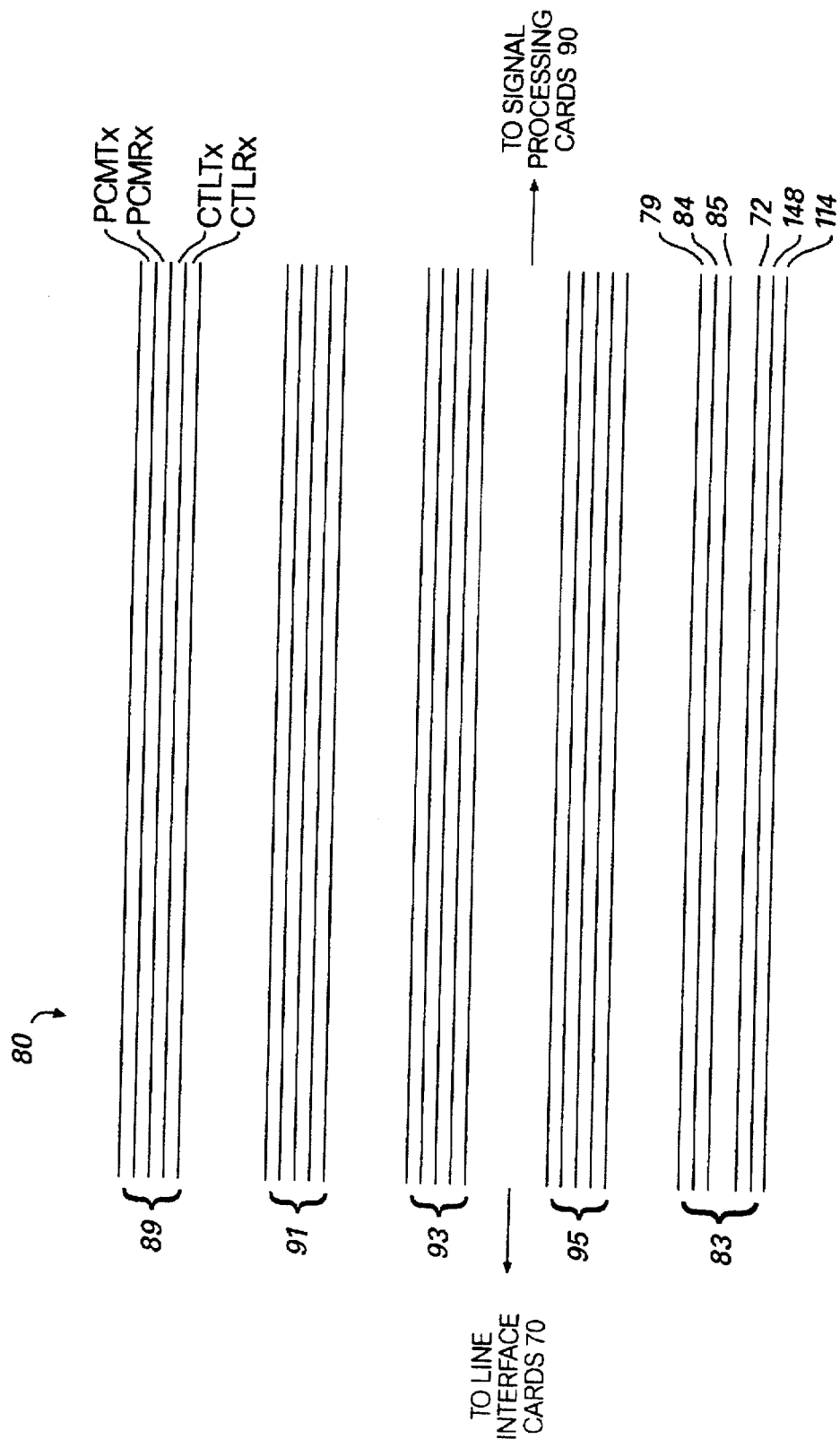
FIG. 10 is a diagram showing some signal lines on the multiplexed bus in the preferred embodiment of the present invention.

The digitized dictation signals are passed from the line interface cards 70 to the signal processing cards 90 on multiplexed bus 80. FIG. 10 is a diagram showing the general layout of multiplexed bus 80. The multiplexed bus 80 is actually comprised of four, four-bit multiplexed bus channels, 89, 91, 93 and 95, respectively. All four of the multiplexed bus channels, 89, 91, 93 and 95, share common clocks on lines 85 and a frame synchronization signal on line 84.

Each of the four bus channels, 89, 91, 93 and 95, on the multiplexed bus 80 contains a PCM transmit (PCMTx) and a PCM receive (PCMRx) bus to carry the µ-law voice data between the line interface card 70 and signal processing card 90. The PCMRx bus carries the "Voice In" signals that arrive at the line interface cards 70 on line 25 to the signal processing cards 90. The PCMTx bus carries digitized voice from the signal processing cards 90 to the line interface card 70 to be output to a transcribe station 30 (FIG. 1). Likewise, the control transmit CTLTx and control receive CTLRx carry the digitized identification signals between the line interface cards 70 and signal processing cards 90.

Each bus channel, 89, 91, 93 and 95, connecting a line interface card 70 to a signal processing card 90 uses time division multiplexing although other forms of multiplexing could be used, as will be familiar to those skilled in the art. In the preferred embodiment, the multiplexed bus 80 is an extension of the Serial Telecom Bus ("ST-BUS") standard produced by Mitel Corp., and discussed in Mitel Application Note MSAN-126. The multiplexed bus 80 is a high speed, synchronous serial bus for transporting digital data. The multiplexed bus 80 includes additional clocking signals on lines 85 so that the system can interface with many standardized bus formats.

Digitized dictation segments are transmitted on one of the bus channels, 89, 91, 93 or 95. All four bus channels 89, 91, 93 and 95 are carried on the multiplexed bus 80 in frames. The frame synchronization signals on lines 84 indicate the beginning of each frame. Multiple frame synchronization signals are available on lines 84 to permit compatibility with various other standard PCM digitized voice data busses. In the preferred embodiment of the present invention, each frame of data is 256 bit clocks long, producing a frame rate of 8 kHz (2.048 MHz/256=8 kHz). Each frame is divided into 32, 8-bit time slots. Each frame is 256 bits long and four bits wide.

Referring to FIGS. 1 and 10, each line interface card 70 having access to the multiplexed bus 80 is assigned by the timing card 110 to eight consecutive time slots in a frame, and the block enable signals on lines 67 (FIG. 7) of that card 70 are only active during these time slots. Therefore, each of the up to eight dictation or transcription stations, 20 and 30 respectively, being serviced by one line interface card 70 and signal processing card 90 communicates through eight time slots, with each dictation station 20 or transcription station 30 begin assigned one time slot (FIG. 1).

Put another way, each line interface card 70 can service eight dictation or transcription stations, 20 and 30, using eight time slots in a frame. There are thirty-two time slots per frame, meaning that one frame on one bus channel 89, 91, 93 or 95 (FIG. 10) can carry digitized dictation signals from or to up to thirty-two dictation or transcription stations, 20 and 30. Because each line interface card 70 services up to eight dictation or transcription stations, 20 and 30, thirty-two dictation or transcription stations, 20 and 30, are serviced by four line interface cards 70 and use every time slot in a frame on a bus channel, 89, 91, 93 or 95.

Further, all four of the bus channels, 89, 91, 93 and 95, on bus 80 transmit frames simultaneously, so that four frames (one per bus channel) are simultaneously transmitted (FIG. 10). Because there are 32 time slots per frame, the four frames simultaneously transmitted have 128 time slots. Each time slot carries one channel of digitized dictation signals. Therefore, the multiplexed bus 80 carries 128 voice and data channel pairs (32 channels/frame×4 frames). Therefore, in the preferred embodiment, the multiplexed bus 80 in the modular digital dictation system 10 can service up to one-hundred and twenty-eight digital dictation or transcription stations, 20 and 30, at a time (FIG. 1). Those skilled in the art will recognize that the capacity of the multiplexed bus 80 can be expanded to serve more units in a variety of manners.

Like the line interface cards 70, each signal processing card 90 is capable of processing eight (8) channels of digitized dictation signals. Given the limit of 128 channels on the multiplexed bus 80, up to sixteen (16) signal processing cards 90 may be connected to the multiplexed bus 80.

In the preferred embodiment of the present invention, each timing card 110 can monitor a maximum of sixty-four (64) channels of digitized dictation signals (FIG. 6). Therefore, only one-half the total capacity of the modular digital dictation system 10 can be serviced by a single timing card 110.

Referring now to FIG. 6, for large systems with greater than sixty-four (64) total dictation and transcription stations, 20 and 30, an additional timing card 110 is added to the system. The additional timing card 110 is physically identical to the already present timing card 110 (called the "master"). The second timing card 110 simply acts as a "slave" module under the control of the master timing card 110.

In the larger systems, the slave timing card 110 is typically connected to a plurality of line interface cards 70. The line interface cards 70 connected to the slave timing card 110 put data on the multiplexed bus controlled by the slave timing card 110. The clock and synchronization signals on the slave timing card 110 are synchronized with the corresponding signals on the master timing card 110 via cabling connecting connectors 154 on both the slave and master timing cards.

Wires on bus 156 carry the control signals between the master and slave timing cards 110. Switches (not shown) connected to connectors 154 are used to indicate whether a timing card 110 is a master or a slave timing card 110. Furthermore, the signals on bus 156 indicate to the master timing card 110 whether it is connected to a slave timing card 110.

The digitized dictation signals are passed from the slave timing card 110 to the master timing card 110 through transceivers 155 (FIG. 6). In the preferred embodiment, the transceivers 155 are RS-485 transceivers, familiar to those skilled in the art. Connector 154 is two 15 pin connectors in the preferred embodiment, and connector 154 is connected by wire cabling to the connector 154 on the slave timing card 110. The master timing card 110 assigns specific frames and time slots on its multiplexed bus 80 to the slave timing card 110. The cross-point switch 158 multiplexes and demultiplexes data, as required, onto the master timing card 110 controlled multiplexed bus 80. Thus, digitized dictation signals are passed from the multiplexed bus 80 on the slave timing card 110 to the multiplexed bus 80 on the master timing card 110, and vice-versa.

c) The Signal Processing Cards

FIG. 8 is a block diagram of a signal processing card 90 in the preferred embodiment of the present invention. FIG. 9 is a detailed diagram of a signal processing card 90 in the preferred embodiment of the present invention. Reference is made to both of these figures throughout this section.

Digitized dictation segments coming from digital dictation stations 20 or going to transcription stations 30 are passed through a signal processing card 90. The signal processing cards 90 serve as an interface for transferring digitized dictation segments between the multiplexed bus 80 and the AT bus 116 (FIG. 2). Each signal processing card 90 compresses and expands the digitized dictation segments, provides variable playback speed, and provides VOR recording and low-level communications. The primary function of the signal processing cards 90 is voice data compression and expansion, thereby optimizing data storage in central station 50, but those skilled in the art will recognize many functions that may be performed in the signal processing cards 90. In the preferred embodiment, the compression and expansion of voice data is done using an ADPCM algorithm, familiar to those skilled in the art.

The switch 97 connects the multiplexed bus 80 to the serial bus 65 used by the digital signal processors (DSPs) 98. In the preferred embodiment of the present invention, the switch 97 is the Mitel MT8980DP, manufactured by Mitel Corp. The serial bus 65 has two wires, one carrying data from the switch 97 to the DSPs 98 and one carrying data from the DSPs 98 to the switch 97. The switch 97 performs the multiplexing necessary to convert the digitized dictation signals from the four wire multiplexed bus channels 89, 91, 93 and 95 to the two wire serial bus 65. When digitized data segments are received by the signal processing card 90 from a dictation station 20, the CTLRx control and PCMRx voice data are multiplexed in switch 97 and sent to the DSPs 98 via the serial bus 65. When digitized data segments are being transmitted from the signal processing card 90 to a transcription station 30, the switch 97 separates the PCMTx voice data and the CTLTx control data and places the data on the appropriate bus channel and time slot of the multiplexed bus 80.

Both the dictate and transcribe stations have access to bi-directional voice and control data paths, although the forward path for voice signals is not normally employed from transcription stations. Digitized voice signals are passed back over multiplexed bus 80 to dictate stations when the dictator operating the station is aurally reviewing a segment of dictation. Similarly, control data passes bi-directionally, passing key presses and foot pedal signals from the stations and display update information back to the station.

Switch 97 can actually monitor up to sixteen (16) dictation stations 20 and/or transcription stations 30 on its bus channel for activity. The switch 97 can only service eight input or output channels at any one time, but as long as simultaneous use of the sixteen dictation or transcription stations, 20 and 30, remains at or less than 50%, the switch 97 can detect and service the active stations. Thus, the switch can monitor eight (8) inactive stations and service eight (8) active stations. The selection of which channel, 89, 91, 93 or 95, the signal processing card 90 in FIG. 9 operates upon is determined by the AT card 40 at system start-up, as was discussed above.

The tertiary processor 96 monitors the transfer of digitized dictation signals between the multiplexed bus 80 and the DSPs 98 via lines 64 (FIG. 9). The dictation stations 20 and transcription stations 30 communicate messages concerning digitized dictation segment to the central station 50 in a block protocol. Messages from the dictation and transcription stations, 20 and 30 (FIG. 1), are received in switch 97 and decoded into bytes by DSP processor 98 and passed on to tertiary processor 96 via bus 64. The tertiary processor 96 builds the bytes into messages and stores the messages received from the dictation stations 20 in RAM 82. The tertiary processor 96 also checks the messages via lines 64 for communications errors by running cyclic redundancy checks (CRC), familiar to those skilled in the art. The tertiary processor 96 also initiates acknowledgment messages (predetermined bytes that are messages) for the dictation stations 20 and transcription stations 30 in a manner familiar to those skilled in the art.

Messages from the dictation and transcription stations, 20 and 30, are used to initiate communications, end communications and identify which dictation and/or transcription station, 20 and 30, is communicating with the central station 50 (FIG. 2). For example, when the user of a dictation station 20 picks up the microphone 26 (FIG. 5), the "CONNECT" message is identified by processor 94 (FIG. 9). The processor 94 communicates an identification number for the dictation or transcription station, 20 or 30, and the "CONNECT" message to the AT card 40 via RAM 82. Processor 96 sends an acknowledgment message through the signal processing card 90 to the dictation or transcription station 20 or 30. Processor 94 then processes the message and sends a separate message to AT card 40 via the 2k AT window 104 (FIG. 8).

Referring to FIG. 8, the tertiary processor 96 communicates messages with the secondary processor 94 via an eight kilobyte (8k) shared portion of RAM 82. The messages passed through the eight kilobyte (8k) portion of RAM 82 include headers containing digitized information signals relating to the digitized dictation segments. The tertiary processor 96 sets a flag on interrupt line 47 (FIG. 9) when a message is available in RAM 82, and the secondary processor 94 retrieves the message and then sets a flag on interrupt line 46 to indicate that the message has been retrieved.

Messages passed to the secondary processor 94 are stored in a two kilobyte (2K) window 104 in DRAM 100 (FIG. 8). Messages passed from the RAM 82 to the secondary processor 94 are carried on bus 64 to bus 58 (FIG. 9). Data buffer 51 controls access to bus 58. Messages are passed from the DRAM 100 to the AT card 40. The AT card 40 accesses DRAM 100 by addressing the communications window 104 (FIG. 8). Each signal processing card 90 in the system has a unique address on the AT bus 116 for its 2K window 104. The address of each window 104 is set by the timing card 110 in the control register 86 (FIG. 9). The control register 86 is loaded with the address by the secondary processor via line 108. The control register 86 in turn, loads an address decoder 106 via line 88. When the AT card 40 addresses the communications window 104, the address decoder 106 outputs an interrupt signal on line 107 that stops secondary processor 94 from accessing DRAM 100 and gives the AT card 40 access to the DRAM 100. The AT card 40 is informed of a message in DRAM 100 by an interrupt signal on line 87. The secondary processor 94 sets the interrupt signal on line 87.

After the "CONNECT" messages have opened communications, digitized dictation segments can be processed by the signal processing card 90. Each DSP 98 in the signal processing card 90 supports two dictation stations 20 or two transcription stations 30 (or one dictation station 20 and one transcription station 30). The frame synchronization signal and bit clocks enter the signal processing cards 90. The frame synchronization signal and bit clocks allow the DSPs 98 to identify the digitized dictation segments by their time slot on multiplexed bus 80.

Continuing with FIG. 9, the digitized dictation segments entering each DSP 98 are compressed and stored in RAMs 63, each DSP 98 having an associated RAM 63. Those skilled in the art are familiar with compressing data for storage. The RAMs 63 are broken into multiple buffers. Therefore, while one buffer is being loaded with digitized dictation segments, another buffer can be emptied. When a buffer in RAM 63 is filled, the tertiary processor 96 receives an interrupt signal from the DSP 98 (FIG. 8). The tertiary processor 96 notifies the secondary processor 94 of the filled buffer using an interrupt signal on line 47.

The secondary processor 96 will then transfer the compressed digitized voice data from the filled RAM 63 to its own DRAM 100 using the direct memory access (DMA) controller 60 (FIG. 9). The DMA controller 60 communicates with the DSPs 98 via lines 59. Lines 59 carry control signals and digitized voice between the DMA controller 60 and the DSPs 98. The secondary processor 96 controls the DMA controller 60 to transfer data on bus 58 via signals on line 61 (FIG. 9).

Communication of digitized dictation segments between the signal processing cards 90 and the AT card 40 occurs over ISA bus 116. FIG. 8 illustrates the control over communication of digitized dictation segments between the AT card 40 and the signal processing cards 90. Digitized dictation segments are passed between the secondary processor 94 and the AT card 40 via a thirty-two kilobyte (32K) shared window 105 in DRAM 100.

The AT card 40 accesses the window 105 in the same manner as it accesses the window 104. Specifically, the address of the window 105 is transferred form the secondary processor 94 to the address decoder 106 via control register 86. When the 32K memory window 105 is loaded with digitized dictation segments, the secondary processor 94 sends an interrupt signal to the AT card 40 via line 87. The AT card 40 addresses the address decoder 106 via ISA bus 116. Address decoder 106 identifies that the AT card 40 is addressing the 32K window 105, and sends an interrupt signal to the secondary processor 94 via line 107. The secondary processor 94 relinquishes control over the DRAM controller 99 to the AT card 40. The AT card 40 can then access the 32K window 105.

The 32K window 105 is also used to receive digitized dictation segments from the AT card 40 that are intended for transcription stations 30. Specifically, files holding digitized dictation segments are transferred from memory 130 by the AT card 40 to the 32K window 105. The AT card 40 simply addresses the 32K window 105, causing an interrupt signal on line 107', and writes data to the window 105. Contention for the 32K window 105 is controlled by secondary processor 94 via bus driver 103. Specifically, the secondary processor 94 prevents the AT card 40 from writing over digitized dictation segments stored the 32K window 105 of DRAM 100 via the bus driver enable signal on line 102.

Those skilled in the art will recognize that the signal processing cards 90 decompress digitized dictation segments transferred from memory 130 and going to transcription stations 30. Digitized dictation signals pass from the ISA bus 116 through the signal process cards 90 and to the multiplexed bus 80 in the reverse manner of that set forth above.

d) The AT Bus

Referring to FIG. 1, digitized dictation segments coming from digital dictation stations 20 are passed from the signal processing card 90 to the AT card 40 on the AT bus 116. Likewise, the digitized dictation segments retrieved from memory 130 that are intended for a transcription station 30 are passed on bus 116 from the AT card 40 to the signal processing cards 90. The AT bus 116 includes address, data and control busses, as is familiar to those skilled in the art.

e) The AT Card

The "CONNECT" signal generated at the dictation or transcription station, 20 or 30, is passed through the line interface card 70 to a signal processing card 90 (FIG. 9). The "CONNECT" signal is then passed as a block of digital data to the AT card 40. The "CONNECT" message is sent via RAM 112 in a signal processing card 90.

Referring to FIG. 5, once the AT card 40 receives a "CONNECT" signal from a dictation station 20, a file manager, for example file manager 134a, opens a file in memory 130 to hold digitized dictation. An IKI program 200a-n, for example IKI program 200a, is assigned to the dictation station 20. If the connect signal is from a transcription station 30, the file manager 134a locates a file in memory 130 to be transcribed. The file manager 134a running on the AT card 40 initiates a "CONNECT ACKNOWLEDGE" message that is sent to the DSP card CPU 94. Additionally, the file manager 134a generates a job number, called an identification number 160 herein, for each dictation session. The identification number 160 corresponding to each initiated dictation session is used by the AT card 40 as a label for storing the digitized voice produced during the dictation session by the dictation station 20. The user of the dictation station 20 may now begin dictating. As set forth below, dictation is written to the memory 130 via the mirror program 198b.

The signal processing cards 90 receive and temporarily store the digitized dictation segments to be stored in memory 130 under the control of the AT card 40. The AT card 40 retrieves the files from RAM 100 on the signal processing cards 90 via the ISA bus 116 (FIG. 9), as is set forth above.

Continuing with FIG. 5, the file managers 134a-n are executed by the AT card 40. Each file manager 134a-n is a state machine that tracks the creation, storage and retrieval of a file. The file managers 134a-n, and the IKI programs 200a-n, utilize multitasking to track the simultaneous creation, dictation, retrieval and transcription of multiple files from the plurality of dictation stations 20 and transcription stations 30. All of the dictation stations 20 and transcription stations 30 interacting with the central station 50 are simultaneously tracked by one of the file managers 134a-n and IKI programs 200a-n. As is familiar to those skilled in the art, the OS/2 operating system for AT computers, like the AT card 40, can run many duplicate copies of one program nearly simultaneously. This plurality of simultaneously operating programs are called "threads". One thread of the file managers 134a-n and IKI programs 200a-n services each open channel. Therefore, the AT card 40 multitasks on a version of the file managers 134a-n and IKI programs 200a-n to separately service each open channel.

Figure 12:
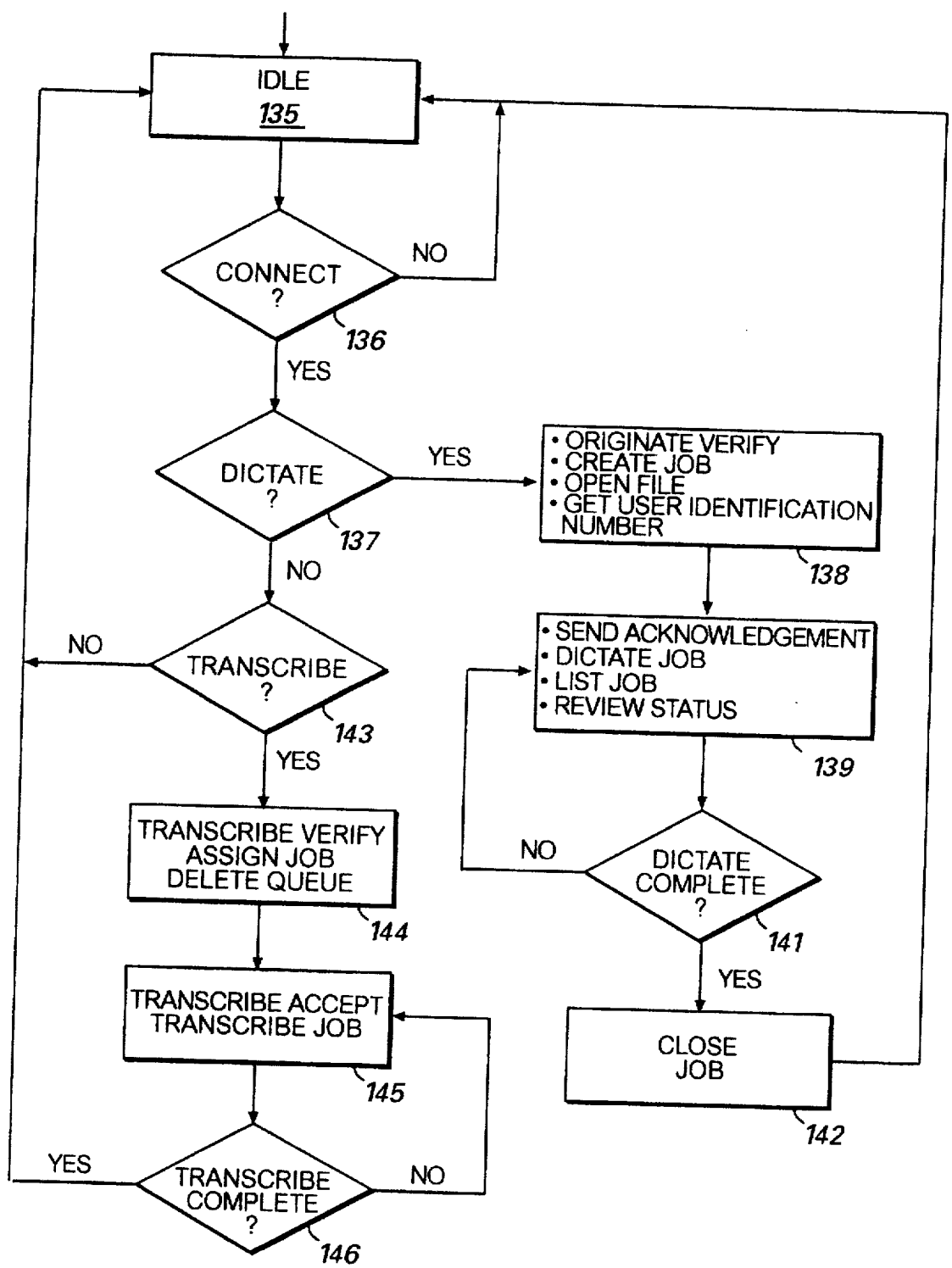
FIG. 12 is a high level flow diagram of the file manager program in the AT card of the present invention.

Referring to FIGS. 5 and 12, the operation of the AT card 40 in accepting, storing, and outputting dictation signals is set forth. FIG. 12 is a flow chart of the functioning of the software in the AT card 40, including a file manager program 134a-n. When a CONNECT signal is detected at step 136, one of the IKI programs 200a-n and one of the file managers 134a-n leaves the idle step 135.

The activated file manager, for example file manager 134a, then determines if the station connecting to the central station 50 is a dictate station 20 or a transcribe station 30 (FIG. 1). The file manager 134a (FIG. 5) determines if a dictation session starts at step 137 (FIG. 12). The file manager 134a determines if a transcription session starts at step 143. The "CONNECT" message includes a byte that identifies whether the station is a dictation or transcription station, 20 or 30.

If a dictation session is started at step 137, following the "Yes" branch the file manager 134a creates a file in memory 130 to hold the digital dictation signals at step 138 (FIGS. 5 and 12). The file manager 134a assigns a unique job identification number 160 to each file created and lists the job identification number 160 in the order created to form a job queue for prioritizing work to be transcribed. The new file number is added to the end of the table of files received 161 (FIG. 12, discussed below) in the records manager 216 (FIG. 5). The table of files received 161 is used to track the order of the files received so that each file can be transcribed in the order received, if desired.

Other functions are performed at step 138 (FIG. 12), including creating the header for the new file. The header for a preferred file includes the job identification number, status information, the length of the job, and other pertinent information. The preferred handset 26 (FIG. 7) on the transcription station 20 (FIG. 5) includes a bar code reader (not shown). The reader is provided to allow tagging dictation to bar coded files, such as a patient identification bar code that is on patient X-rays. The health care professional would simply read the bar code using handset 26 before a dictation session, and the patient identification number is transferred into the file header.

The status information in the header is typically predetermined bits that are used by the records manager 216 to determine how the file is transcribed (FIG. 5). For example, the header will include information about who dictated the file. Further, there are bits in the status register to indicate that the file should only be sent to a certain transcription station 30. Because digitized dictation is transferred to the memory in eight (8) kilobyte segments that may be stored in various locations in memory 130, the header also includes a map of the order and location of all the eight kilobyte segments in a single file.

Also at step 138, the records manager 216 builds tables and arrays, such as are described below with regard to FIG. 11. The tables include tables containing user identification numbers, job identification numbers, sequence numbers and other identification numbers. These tables are used to find and sort the files in memory 130, as is set forth below.

Those skilled in the art will recognize that the file manager 134a executes a "create job" sub-routine that causes the mirror program 198a to create a file in memory 130 using the unique identifier number (FIG. 5). The mirror program 198a assigns an open file handle to each file created, and the file manager 134a uses the file handle to load and unload digitized dictation segments in the file via the mirror program 198a. Each digitized dictation segment is stored in two locations in memory 130 as a back-up system.

After step 138 (FIG. 12), the actual dictation of the job is performed at step 139. At this step, the user can review the digitized dictation signals in the file, dictate the job or perform other desired functions, such as adjust the speed of playback. The mirror program 198a directly writes to and reads from files in memory 130 using a direct memory access call familiar to those skilled in the art and with the OS/2 system. Because the digitized dictation is written in eight (8) kilobyte segments, the user can insert additional data or delete data via predetermined controls at the user handset, as will be familiar to those skilled in the art.

The file manager 134a determines when the dictation session is closed at step 141. A "HANG-UP" or "END" signal generated at the dictation station 20 marks the end of dictation session. After the dictation session is terminated at step 141, the file manager 134a goes to step 142 and closes the file. Once the file is closed at step 142, the particular file manager 134a and IKI program 200a that are servicing the open channel return to the idle state at step 135.

If a transcription station 30 initiates a transcription session at step 143 (FIG. 12), following the "Yes" branch the transcription process is begun at step 144. First, a file manager and IKI program, for example file manager 134b and IKI program 200b (FIG. 5), are assigned to communicate with the transcription station 30. The transcription process at step 144 includes the assignment of a particular file to the transcription station 30. Retrieval of a file typically first entails prioritization based upon the user identification number, patient identification number, the status information or other information in the file header. If no prioritization is performed based on the user identification number or other identification number, the files may be retrieved from memory 130 on a first-in, first-out basis using the table of files received table 161 (FIG. 11, below).

Continuing with FIGS. 5 and 12, at step 145 the actual transcription process is begun. The transcriptionist has the ability to receive and review the digitized dictation signals at step 145. Again, the mirror program 198a (FIG. 5) allows reading from the open file just like any application program, familiar to those skilled in the art. The digitized information is passed through the file manager 134b, IKI program 200b, signal processing card 90, and to the line card 70, where the digitized dictation is converted to audio and passed to the appropriate transcription station 30 (FIG. 1). Once the transcription is completed, as determined at step 146 (FIG. 12), the file manager 134b sets a predetermined bit in the status section of the header and closes the transcribed file. After transcription is completed at step 146, following the "Yes" branch the file manager 134b and IKI program 200b are quit and the system returns to the idle step 135.

In the preferred embodiment, files are retained until the memory 130 is ninety-five percent (95%) full, as determined by the mirror program 198a. After the memory 130 is ninety-five percent full, the records manager 216 searches for the oldest file that has been transcribed, as indicated by the status section in the header of the files. The identification numbers for the deleted file are removed from the tables in the records manager 216, and the file manager 134b returns to the idle step 135.

The status section of the file header may have a predetermined bit that, if set, indicates that the file cannot be deleted. Typically, this bit is set and released via preprogramming the record manager to recognize and mark certain files as not being deletable. Those skilled in the art are familiar with preparing and changing headers in files.

As set forth above, all of the files of digitized dictation signals are stored in memory 130. The plurality of dictation stations 20 are capable of producing thousands of files, and the dictation and transcription stations, 20 and 30, must have immediate access to these files. When a person is dictating a file and desires to review the data or when a transcriptionist calls for a file, the file must be quickly retrieved from memory 130.

Users may wish to access particular files using a user identification number, job identification number, or other identification number. However, opening each file in memory 130 and searching the files is prohibitively time consuming. Therefore, in the preferred embodiment, a fast search program 166 is part of the records manager 216 that operates on AT card 40 to quickly access files stored in memory 130 (FIG. 2). The fast search program 166 searches among a table containing an array of all identification numbers representing the opened files. In the present example, the array 162 contains job identification numbers 160.

Figure 11:
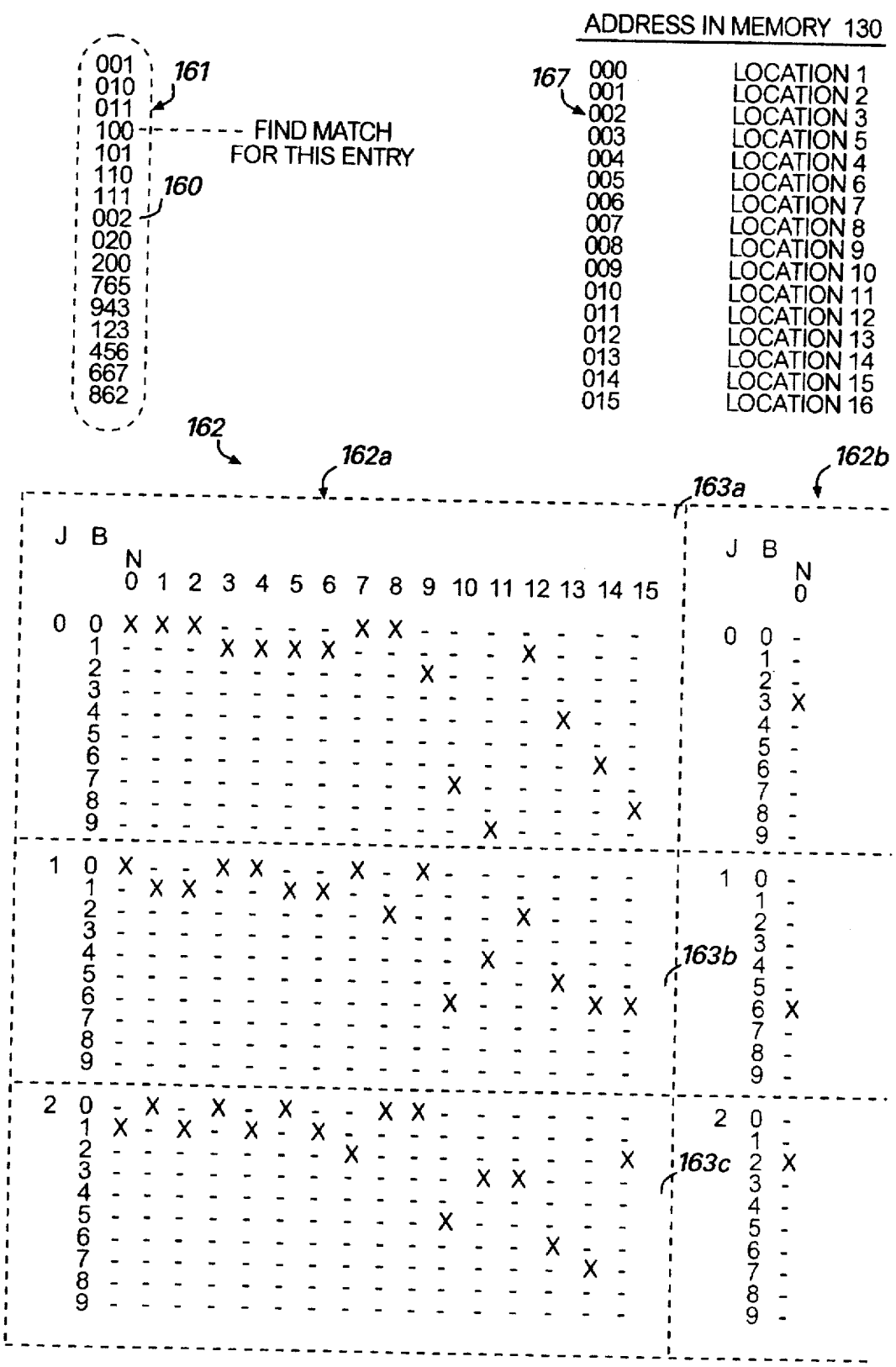
FIG. 11 is a diagram of an array of identification numbers in the fast search program in the preferred embodiment of the present invention.

FIG. 11 is a diagram of the array 162 of identifiers 160 created by the fast search program 166 and stored in the AT card 40. The array 162 is divided into a number of identically structured arrays 162a–n, as set forth above. In the preferred embodiment of the fast search program 166, the identification number 160 associated with each file in memory 130 is loaded into array 162 as each file is opened (FIG. 11).

Continuing with FIG. 11, each identification number 160 has three digits, with each digit being a number from zero (0) to nine (9). Each array 162a–n is divided into a number of sub-arrays, 163a, 163b and 163c, the number of sub-arrays in an array 162a being equal to the number of digits in an identification number 160. Thus, there are three (3) sub-arrays, 163a, 163b and 163c, in array 162a, as there are three digits in each identification number 160.

Each sub-array 163a, b and c has a vertical dimension equal to the number of possible values for a digit in the identification number 160. Therefore, each sub-array 163a, b and c in FIG. 11 has vertical dimensions of 0–9, representing the possible values for each digit in the identification number 160.

The array 162a is sequentially loaded with identification numbers 160 as each file is created. Each column in the array 162a contains one identification number 160 for one file. The array 160 has a horizontal dimension of sixteen (16) bits, although it could be thirty-two bits. In the present example, the first file received and stored in the table of files received 161 has an identification number 160 of "001". The first digit of the identification number 160 for the first file received is marked in column 0 of sub-array one 163a. In FIG. 11, the first digit for the first file is "0", and row zero, column zero in sub-array 163a is marked. The second digit for the first file is also "0". The second digit of the identification number 160 for the first file is marked in row zero, column zero of sub-array two 163b. The third digit for the first file is "1". The third digit of the identification number 160 for the first file received is marked in row one, column zero of sub-array three 163c. Thus, each digit for an identification number 160 corresponding to a file is loaded in the appropriate row, with all digits of one identification number 160 being in one column.

Likewise, the first, second and third digits of the identification number 160 (equal to "010" as seen in the table 161) for the second file are placed in column 1 of sub-arrays 163a, 163b and 163c, respectively. Therefore, identification numbers for the sixteen files shown in FIG. 11 are stored in the sub-arrays 163a, 163b and 163c. For more than sixteen files, more arrays 162b–n identical to array 162a are created.

To retrieve a file, the user has a specific identification number 160 for the desired file, such as the identification number "100". The fast search program creates a sixteen bit mask of "1"s. The mask is ANDed with the row one in sub-array 163a. The result is a mask with "1" in columns 3, 4, 5, 6 and 12, and "0" in all other columns. This resulting mask is ANDed with row zero in sub-array 163b. The result is a mask with "1" in columns 3 and 4 and "0" in all other columns. Finally, the resultant mask is ANDed with row zero in sub-array 163c. The result is a mask with a "1" in column four and "0" in all other columns. The file found in column four corresponds to job number "100". The search avoids searching all the numbers in the table 161, and finds the identification number 160 via only three operations.

The fast search program 166 now knows the position of the file of interest in array 162a. This information is used to access the actual file in memory 130 using a host array 167 (FIG. 11). The address of each file is sequentially stored in the host array 167 as each file is created. Likewise, the array 162 is sequentially loaded with identification numbers 160 as each file is created. The fast search program 166 uses the position in array 162 as a pointer to the host array 167, which contains address of the file in memory 130. The array 162 and host array 167 correspond because they are loaded with data simultaneously, as set forth below.

In a first embodiment of the fast search program 166, when array 162 is first compiled, before any identification numbers 160 are loaded into array 162, the addresses in host array 167 are linked to each bit position in array 162. Therefore, the address of the file for the identifier in column zero, row zero of array 162 is set to address "0" in the host array 167. The host array 167 is loaded with the address for the file in memory 130 as each file is created. In this preferred embodiment, a "C" compiler generates the link between array 162 and host array 167.

Alternatively, the line card task program 134 can generate a pointer into host array 167 every time a file is identified for retrieval. The formula for generation of the pointer is:

Pointer=((bits per digit * (max # files/16+1) * first digit in ID #)+((second # digit * (max # files/16+1)+(ID number/16))

The above formula is for a two digit identification number 160 and sixteen bit wide arrays 162a–n. Those skilled in the art will recognize that the above calculation uses the bit position in array 162a–n of an identification number 160 to calculate the position of the desired address in host array 167. The address loaded in host array 167 and pointed to by the formula is the address in memory 130 of the desired file. The fact that the host array 167 and the array 162 are simultaneously loaded generates the correspondence between the two arrays that is used by the above formula to calculate the address of the file in the host array 167 based on the bit position of the identification number 160 in array 162.

By calculating the address in the host array 167 of the file found in array 162, the file in memory 130 is located. Furthermore, calculating the address in host array 167 for each bit position in array 162 in real-time allows the files to be created and deleted at any location in memory 130 in real-time, and the arrays 167 and 162a–n need not be created before operation so that the size of the arrays 167 and 162a–n need not be fixed.

The fast search program 134 also can search for files if all the digits in an identification number 160 are not known. In this case, all files corresponding to the known identification digits 160 in array 162 are found. The address in host array 167 is calculated for each file, and the pointer to the files in memory 130 are utilized to retrieve the files. Thus, even if one digit of the identification number 160 is lost or illegible, a number of files can still be retrieved and perused to find the desired file.

Those skilled in the art will recognize that when more than sixteen (16) files are stored in memory 130, more sub-arrays 162a–n are formed for each additional identification number. Thus, the array 162 can include as many arrays 162a–n as needed to hold all the files that are created. Those skilled in the art will recognize that the dimensions of the arrays 162a–n and 167 may be altered and other formulas for calculating an address in host array 167 may be used.

A number of other tables may be stored in the records manager 216. These tables may contain patient and other information. For example, a table may contain the allergies for each patient in the hospital. The file manager 134a will search the header in each file for a particular patient number. If the particular patient number is found, the file manager 134a will put information concerning the allergies into the header of the corresponding file. Such a system can be used for a variety of information.

Referring to FIG. 5, the remainder of the operations of the AT card 40 are now set forth. The AT card 40 incorporates commercially available SQL database software, including the server 222, database 224 and database manager 220. The database 224 maintains a copy of the tables in the records manager 216 for access via the management console 140. The console 140 is used by the user to monitor and sort the files in the memory 130. As will be familiar to those skilled in the art, the user can monitor system capacity and use patterns to improve service. Further keeping the tables in the database 224 prevents slow downs that would be caused by accessing the tables in records manager 216 from console 140. Other database software familiar to those skilled in the art may be utilized to provide information for review to the console 140.

The get job program 230 is used by the records manager 216 and database manager 220 to obtain information from the headers in the files in memory 130. For example, at boot-up the records manager 216 uses the get job program 230 to retrieve information about the files to build the tables of information.

The debug program 232 accepts input from the other programs in the AT card 40. Also, the tables in the database 224 and in records manager 216 are compared to ensure and maintain consistency and provide redundancy. Such a comparison of tables is familiar to those skilled in the art. The debug program 232 address discrepancies between the tables. These programs report to the debug program 232 when a fault in the AT card 40 occurs. The debug program 232 can be accessed locally through the healthcheck port (such as a parallel port), a remote diagnostic port or monitor and keyboard, as will be familiar to those skilled in the art. Those skilled in the art are familiar with the modem, IDE interface, NetBIOS protocol and other commercially available hardware and software that may be used in the AT card 40.

Similarly, the operation of the management console 140, including the card, floppy drive, hard disk drive, is familiar to those skilled in the art. The primary function of the management console 140 and the software therein is to provide user access to the database 224 in the AT card 40. The preferred management console 140 provides a graphical user interface for organizing and displaying information concerning the files in memory 130. Preferably the console 140 is connected to the AT card 40 via an local area network familiar to those skilled in the art.

The software in the AT card 40 and management console 140 can be created via conventional software techniques familiar to those skilled in the art. The preferred software in the AT card 40 and management console 140 is written using the WINDOWS Software Development Kit Ctt sold by Microsoft Corporation of Redmond, Wash.

While this invention is described in detail with particular reference to the preferred embodiment thereof, it will be understood that other variations and modifications can be made without departing from the spirit and scope of the invention as defined in the appended claims.

We claim:

1. In a computer storing a plurality of files in a memory device, each said file being assigned a unique identification number, a method of storing and quickly retrieving a selected file via said identification number assigned to said selected file, comprising the steps of:

generating a host array and storing the address of each said file in said memory device in said host array, wherein the addresses of said files are sequentially stored in said host array in the order in which the files are created;

generating a second array contemporaneously with the generation of said host array, wherein said identification numbers for said files are sequentially stored in said second array in the order in which the files are created, and wherein said second array is sub-divided into a plurality of sub-arrays, each said sub-array including a digit from each said identification number;

finding each said digit of said identification number assigned to said selected file in said second array; and calculating a pointer to the location in said host array to the address of said selected file in said memory device based upon the position of said digits of said identification number assigned to said selected file in said second array.

2. The method of claim 1 wherein each said sub-array has a first dimension equal to the total possible number of values that the digits from the identification numbers stored in that sub-array may assume, and having a second dimension equal to the width of a bit mask generated by said computer.

3. The method of claim 2 wherein said step of finding an identification number assigned to the selected file is completed by:

generating a mask; and successively ANDing said mask with the digits in each said sub-array that correspond to the digits of said identification numbers assigned to the selected file.

4. The method of claim 2, wherein a plurality of identification numbers can be found in said second array by:

defining values for some, but not all, digits in an identification number;

generating a mask;

successively ANDing said mask only with the digits in the sub-arrays that correspond to the defined digits in said identification number; and calculating the locations in said host array of the addresses of all the files that are identified by said successive ANDing.

5. In a computer storing a plurality of files in a memory device, each said file being assigned a unique identification number, a fast search computer program product for retrieving said files, said fast search computer program product stored in computer-readable memory and executed by said computer comprising:

an array, said array being divided into a number of sub-arrays, with the number of sub-arrays equaling the number of digits in said identification numbers;

a host array;

a controller operating said fast search computer program product to control:

loading the address in said memory device of each file into said host array as each file is created;

loading each digit of each identification number for each file into a sub-array as each file is created, whereby one sub-array contains all the digits in a given position for each said identification number, and wherein each sub-array has a first dimension equal to the possible values of the digit stored in said sub-array and a second dimension equal to a predetermined maximum number of jobs stored in said sub-array;

selecting an identification number for a selected file to be retrieved;

generating a mask of width equal to said predetermined maximum number of jobs stored in said sub-array;

finding said selected file in said sub-arrays by ANDing said mask with a portion of each said sub-array, said portion of said sub-arrays identified by the value in said first dimension of said sub-arrays that corresponds to the value of said digits in said identifier number for said selected file;

calculating the location in said host array of the address corresponding to said selected file using the position in said sub-arrays of said digits in said identifier number for said selected file; and retrieving said selected file from said memory device using said address from said host array.

6. The fast search computer program product of claim 5, wherein said step of loading the address in said memory device of each file into said host array and said step of loading each digit of each identification number for each file into said host array occur contemporaneously.

7. The fast search computer program product of claim 5, wherein said plurality of files exceeds said predetermined maximum number of jobs, and wherein said fast search computer program product further comprises:

a second array, said second array being divided into a number of second subarrays, with the number of second sub-arrays equaling the number of digits in said identification numbers to store file identification numbers in excess of said predetermined maximum number of jobs; and a second host array to store addresses in excess of said predetermined maximum number of jobs.

8. The fast search computer program product of claim 5, wherein said step of selecting an identification number comprises selecting an identification number with a number of defined digits, said number of defined digits being less than the number of digits in said identification number, and wherein said step of finding said selected file comprises ANDing said mask with a portion of each said sub-array which corresponds to a defined digit.

9. In a computer storing a plurality of files in a memory device, each file having a file identification number comprising a plurality of digits, a method for storing a file in said memory device, using a host array and a pointer array, said pointer array comprising a plurality of pointer sub-arrays, comprising the steps of:

assigning a file identification number to said file;

selecting an address for storing said file;

creating an entry for said host array for said file, said host array entry comprising a pointer pointing to said address;

storing said file identification number in said pointer array so that each said digit of said file identification number is stored in a different pointer sub-array; and storing said file at said address.

10. The method of claim 9, wherein said host array comprises a plurality of sequentially stored host array entries and said pointer array comprises a plurality of sequentially stored file identification numbers, and wherein said step of storing said file identification in said pointer array occurs contemporaneously with said step of creating an entry for said host array.

11. The method of claim 9, wherein said digits of said file identification number have a plurality of possible digit values, and wherein each pointer sub-array has a first dimension and a second dimension, said first dimension equal to said number of possible digit values, and said second dimension equal to a predetermined maximum number of file identification numbers stored in said pointer array.

12. The method of claim 11, wherein, in the event that said pointer array contains said predetermined maximum number of file identification numbers, creating a second pointer array to store an additional file identification number and creating a second host array to store an additional address pointer.

13. The method of claim 9, further comprising the steps of:

receiving a request to retrieve a selected file identified by a selected file identification number;

using said selected file identification number to identify a selected host array entry;

using said selected host array entry to identify a selected address for said selected file; and retrieving said selected file from said selected address.

14. The method of claim 13, wherein each digit of said selected file identification number has a digit value and a digit position, and wherein said step of using said selected file identification number to identify a selected host array entry comprises:

creating a first mask for a first digit of said selected file identification number;

applying said first mask to a first portion of a first pointer sub-array to create a second mask for a second digit of said selected file identification number, said first pointer sub-array corresponding to said digit position of said first digit and said first portion of said first pointer sub-array corresponding to said digit value of said first digit;

applying said second mask to a second portion of a second pointer sub-array to create a third mask for a third digit of said selected file identification number, said second pointer sub-array corresponding to said digit position of said second digit and said second portion of said second pointer sub-array corresponding to said digit value of said second digit; and if said selected file identification number comprises three digits, then applying said third mask to a third portion of a third pointer sub-array to identify a position within said host array corresponding to said selected host array entry, said third pointer sub-array corresponding to said digit position of said third digit and said third portion of said third pointer sub-array corresponding to said digit value of said third digit.

15. The method of claim 13, wherein said selected file identification number comprises a plurality of defined digits, said plurality of defined digits being less than all of the digits of said selected file identification number, each said defined digit having a position and a value, and wherein said step of using said selected file identification number to identify a selected host array entry comprises:

A. creating a mask for a defined digit of said selected file identification number;

B. applying said mask to a selected portion of a selected pointer sub-array to create a masked output, said selected pointer sub-array corresponding to said position of said defined digit and said selected portion of said pointer sub-array corresponding to said value of said defined digit; and repeating said steps A and B for each defined digit until said masked output identifies a plurality of host array entries.

16. A computer-readable medium having computer executable instructions for storing and retrieving a file in a memory device using a host array and a pointer array, said pointer array comprising a plurality of pointer sub-arrays, comprising the steps of:

A. receiving a file identification number for said file, said file identification number comprising a plurality of digits;

B. selecting an address for storing said file;

C. creating an entry for said host array for said file, said host array entry comprising a pointer pointing to said address;

D. storing said file identification number in said pointer array so that each digit of said file identification number is stored in a different pointer sub-array;

E. storing said file at said address;

F. receiving a request to retrieve said file; said request including said file identification number;

G. using said file identification number to identify said host array entry;

H. using said host array entry to identify said address; and

I. retrieving said file from said address.

17. The computer-readable medium of claim 16, wherein said digits of said file identification number have a plurality of possible digit values, and wherein each pointer sub-array has a first dimension and a second dimension, said first dimension equal to said number of possible digit values, and said second dimension equal to a predetermined maximum number of file identification numbers stored in said pointer array.

18. The computer-readable medium of claim 16, wherein said host array comprises a plurality of sequentially stored host array entries and said pointer array comprises a plurality of sequentially stored file identification numbers, and wherein said step C occurs contemporaneously with said step D.

19. The computer-readable medium of claim 16, wherein each digit of said file identification number has a digit value and a digit position, and wherein said step of using said file identification number to identify said host array entry comprises:

successively filtering said pointer sub-arrays by:

A. creating a mask for a digit of said file identification number;

B. applying said mask for said digit to a selected portion of a selected pointer sub-array to create a masked output, said selected pointer sub-array corresponding to said digit position of said digit and said selected portion of said selected pointer sub-array corresponding to said digit value of said digit;

C. repeating said steps A and B for each pointer sub-array; and

D. using said masked outputs to identify said host array entry.

* * * * *

UNITED STATES PATENT AND TRADEMARK OFFICE
CERTIFICATE OF CORRECTION

PATENT NO. : 5,761,529  Page 1 of 2
DATED : June 2, 1998
INVENTOR(S) : Raji et al.

It is certified that error appears in the above-identified patent and that said Letters Patent is hereby corrected as shown below:

Column 9, Line 1: Please replace "FIG. 5 is a block diagram" with -- FIGS. 5A and 5B are block diagrams--.

Column 11, Line 60: Please replace "140" with --141--.

Column 11, Line 63: Please replace "141" with --140--.

Column 13, Lines 60 and 63; Column 28, Lines 1 and 45; and Column 33, Line 1: Please replace "FIG. 5" with -- FIGS. 5A & 5B--.

Column 14, Line 31: Please replace "200a-n" with --134a-n--.

Column 15, Line 15: Please replace "is" with -- is a -- .

Column 15, Line 46; Column 20, Line 50; Column 28, Lines 25 and 55; Column 29, Lines 4, 21, and 39; and Column 30, Lines 2 and 16: Please replace "FIG. 5" with --FIG. 5A--.

Column 28, Line 64; Please replace "FIGS. 5" with -- FIGS. 5A--.

Column 15, Line 53; Column 30, Line 13: Please replace "FIGS. 5" with -- FIGS. 5A, 5B--.

Column 21, Line 61; Column 26, Line 6; and Column 29, Line 12: Please replace "FIG. 5" with -- FIG. 7--.

UNITED STATES PATENT AND TRADEMARK OFFICE
CERTIFICATE OF CORRECTION

PATENT NO. : 5,761,529
DATED : June 2, 1998
INVENTOR(S) : Raji et al.

It is certified that error appears in the above-identified patent and that said Letters Patent is hereby corrected as shown below:

On the title page, item [54] and Col. 1:

Please delete the title of the application and insert in place thereof -- "Method For Storing And Retrieving Files By Using An Array Having A Plurality Of Sub-Arrays Each of Which Includes A Digit Of A File Identification Number"--.

Title page, item [75]

Inventor
Please delete Alexander David Raji and Scott Gregory Henion as inventors.

Signed and Sealed this

Twenty-second Day of September, 1998

BRUCE LEHMAN

Attest:

Attesting Officer

Commissioner of Patents and Trademarks